US012336950B2

(12) United States Patent
Liu et al.

(10) Patent No.: US 12,336,950 B2
(45) Date of Patent: Jun. 24, 2025

(54) STIMULATING DEVICE

(71) Applicant: HYTTO PTE. LTD, Singapore (SG)

(72) Inventors: Dan Liu, Guangdong (CN); Jilin Qiu, Guangdong (CN); Zhiwen Wu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/919,460

(22) Filed: Oct. 18, 2024

(65) Prior Publication Data

US 2025/0134760 A1 May 1, 2025

Related U.S. Application Data

(63) Continuation-in-part of application No. 18/499,094, filed on Oct. 31, 2023.

(51) Int. Cl.
*A61H 19/00* (2006.01)
*A61H 23/02* (2006.01)
*A61H 39/04* (2006.01)

(52) U.S. Cl.
CPC ............. *A61H 19/40* (2013.01); *A61H 23/02* (2013.01); *A61H 39/04* (2013.01); *A61H 2201/01* (2013.01); *A61H 2201/1215* (2013.01); *A61H 2201/1664* (2013.01); *A61H 2201/169* (2013.01); *A61H 2205/087* (2013.01)

(58) Field of Classification Search
CPC ................................................ A61H 19/40–44
See application file for complete search history.

(56) References Cited

U.S. PATENT DOCUMENTS 12,161,598 B1 * 12/2024 Wang ..................... A61H 19/32
2012/0330201 A1 * 12/2012 Turner ................... A61H 19/40 601/46
2016/0045392 A1 * 2/2016 Massey .................. A61H 19/00 601/46
2017/0105896 A1 * 4/2017 Derwin .................. A61H 19/34
2023/0127737 A1 * 4/2023 Raccah .................. A61H 23/02 600/38
2024/0325240 A1 * 10/2024 Zhang ................ A61H 23/0254

* cited by examiner

*Primary Examiner* — Thaddeus B Cox
(74) *Attorney, Agent, or Firm* — Holtz, Holtz & Volek PC

(57) ABSTRACT

A sexual stimulation device includes an actuator having a power output end portion, a main body, and a bionic finger assembly including proximal, middle, and distal components. At least a portion of the main body forms the proximal component. The middle phalanx is hinged to the proximal component, and the distal component is hinged to the middle component. The middle component is coupled to the power output end portion, and the distal component is coupled to the proximal component. A distal portion of the distal component is caused to execute a rocking motion with respect to the first proximal portion of the middle component as the power output end portion is actuated by an actuator.

20 Claims, 25 Drawing Sheets

62

64

STIMULATING DEVICE

CROSS REFERENCE TO RELATED APPLICATION

This application is a Continuation-in-Part of co-pending U.S. patent application Ser. No. 18/499,094, filed on Oct. 31, 2023, the entire contents of which are herein incorporated by reference.

TECHNICAL FIELD

The present disclosure relates to stimulating devices and, more specifically, to flexible stimulating devices.

DISCUSSION OF THE RELATED ART

Stimulating devices are widely used as a means of providing sexual and other forms of stimulation to a user. One popular form of stimulating device is known as the rabbit vibrator which has two stimulation projections that may be used to stimulate two different portions of the user's body at the same time. For example, one stimulation projection might be used to stimulate the clitoris while the other stimulation projection might be used to stimulate the g-spot. However, as the anatomy of each user can be distinct, it is difficult to find a single design that is effective in providing dual stimulation for most users.

To contend with this problem, some rabbit vibrators are adjustable to allow a user to physically bend each projection to a desired shape. However, such stimulating devices might not remain in the desired shape indefinitely. In addition, when the user has multiple different desired shapes that she chooses to switch between, it can be difficult and time consuming to manually adjust each projection each time the user desires a change.

SUMMARY

A sexual stimulation device includes an actuator having a power output end portion, a main body, a middle component, and a distal component. At least a portion of the main body forms a proximal component, and the power output end portion is disposed within the proximal component. The middle component has a first proximal portion and a first distal portion, and the first proximal portion is hinged to the proximal component by an articulated connection. The distal component has a second proximal portion and a second distal portion, and the second proximal portion is hinged to the first distal portion of the middle component by an articulated connection. The proximal component, the middle component, and the distal component together form a bionic finger assembly configured to be inserted into an orifice of human body. The middle component is coupled to the power output end portion, and the distal component is coupled to the proximal component. The second distal portion of the distal component is caused to execute a rocking motion with respect to the first proximal portion of the middle component as the power output end portion is actuated by an actuator. The rocking motion is adapted to cause the second distal portion to achieve stimulation of an erogenous zone within the orifice of human body.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
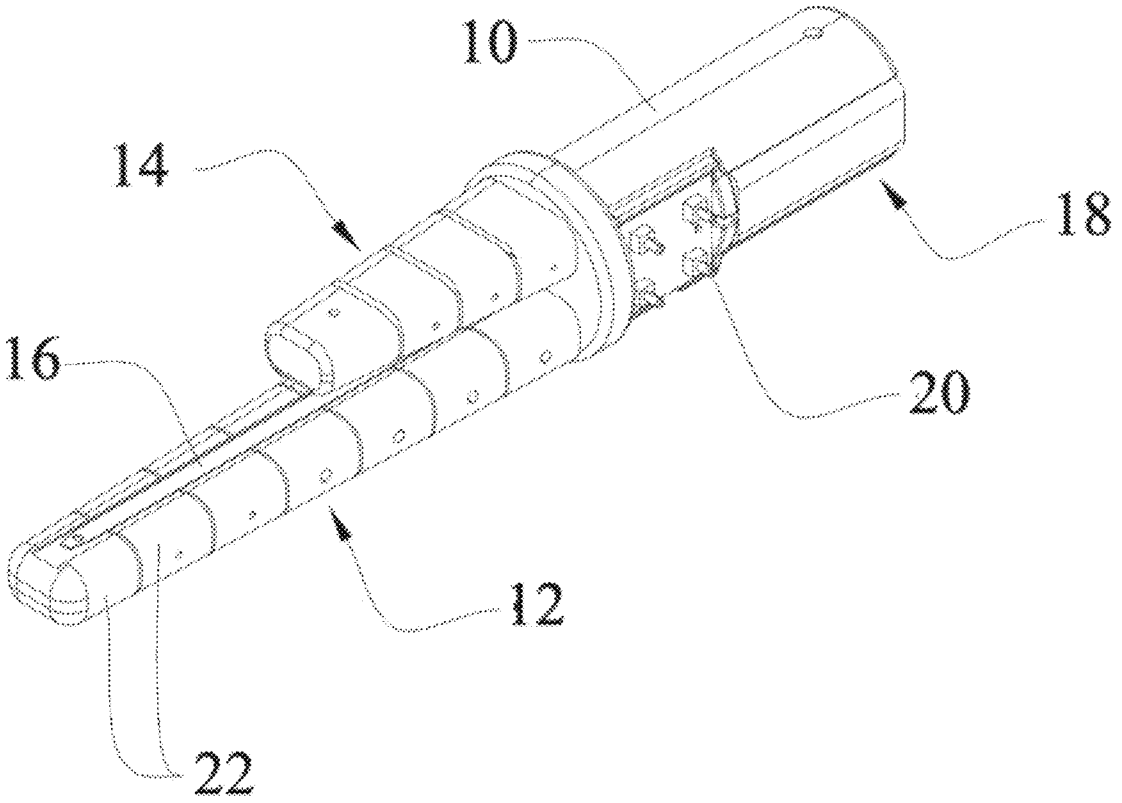
FIG. 1 is a perspective view of a stimulating device in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure relate to a stimulating device (which may also be referred to herein as a stimulation device or a sexual stimulation device) having two projections, referred to herein as stimulation or stimulating members, that are independently adjustable to a desired angle and shape for use in stimulating two parts of a user's body at the same time. The desired angles and shapes are electronically implemented so that the user may quickly and easily switch between multiple presets that she has programmed or customized. The presets may also be animated so as to perform a desired movement plan that may be repeated, rather than simply assuming a single desired arrangement. Presets may be programmed either by inputting instructions though an electronic device such as a smartphone or a computer that might be paired to the stimulating device, or by placing the stimulating device into a learning mode whereby either a static position or an animated routine is recorded as it is controlled by the user so that the user may playback a recorded static arrangement or animated routine. Additionally, the stimulating device may be preprogrammed for a range of different static positions and/or animated routines. In each position or animated routine, the two stimulation members may be independently arranged so that the angle of one is not dependent upon the angle of the other. However, mechanical and/or programmed safeguards may be used to prevent the two stimulation members from being driven so as to make contact with each other and/or push past one another (e.g., collide).

According to some embodiments of the present disclosure, the stimulating device may be remotely controllable, for example, over a wide area network such as the Internet, so that a second user may control the desired arrangement of each projection (stimulation member) so as to stimulate the first user in a desired fashion. This may be done using a control panel that is accessible over a website or a mobile application, the control panel mirroring the buttons of the stimulating device and/or providing a user interface to select from between preprogramed static positions and/or animated routines.

Moreover, the first user of the stimulating device may be a content creator (e.g., a live streamer) and remote control of the stimulating device may be granted to a viewer of the content by way of an online control panel that is accessible to the viewer. This control may be provided automatically upon the satisfaction of predetermined conditions such as the issuance of a monetary tip from the second user to the content creator, with different functionality being provided to the control of the second user based on a set of tiered conditions.

The stimulating device, in accordance with exemplary embodiments of the present disclosure, may include a handle portion (e.g., a base) with one or more stimulation members projecting therefrom. Each stimulation member may be a finger-like appendage including a plurality of joint elements that may be referred to herein as rods. The rods may be joined to one another to create a multi-jointed hinge. The configuration of each rod may be such that it is free to rotate backwards or forwards in a lateral direction, with some limited degree of freedom, so that the entirety of the multi-jointed hinge can achieve an arcing shape. For example, while each multi-jointed hinge may be able to bend left and right, the hinge arrangement between each neighboring jointed rod may prevent bending in other directions such as front and back, or diagonally. However, in other embodiments, front and back motion may be permitted with left and right motion blocked. In some embodiments, each stimulation member may be rotatably mounted to the handle portion so that it may be rotated to allow for motion in any arbitrary direction, while maintaining the condition that the stimulation member can only arc forward and backward within a single plane, although this plane may be changed by the aforementioned rotation. This rotation of the stimulation member may be performed either by an electric motor or manually, for example, by the adjustment of a rotary knob disposed on the handle portion.

Each stimulation member may include an elongated elastic component that may be made of a metal or another bendable (but generally shape-holding) material. The stimulation member may have a substantially flat rectangular shape and may be fixed to a forward-most rod (rod farthest from the handle portion) of the multi-jointed hinge such that when the elongated elastic component is pulled in, the stimulation member bends to one side and when the elongated elastic component is pushed out to neutral, the stimulation member stands out straight. When the elongated elastic component is pushed out past neutral, the stimulation member bends on another side that is opposite to the aforementioned one side, with both directions of motion being within a single plane, as described above.

It is to be understood herein that the elongated elastic components are elastic in so far as their ability to be bent and return to their original shape but are not necessarily stretchable.

The actuation of the elongated elastic component may be implemented by a motor that turns a screw so as to translate rotational motion of the motor into lateral motion. The elongated elastic component may be connected to the screw so as to achieve lateral motion needed to extend out and back. Alternatively, the rotational motor may wind and unwind the elongated elastic component thereover so as to achieve the needed lateral motion. One or more gears may be used to control the spin characteristics of the motor and/or to implement bidirectional turning. Alternatively or additionally, adjusting the supply voltage may be used to control the speed and direction of the motor.

A protective covering or skin may be disposed over each of the stimulation members and encompassing all of the constituent rods. Within this skin a stimulating component, such as a vibrating motor, may be disposed. The stimulating component may be disposed within the forward-most rod of the multi-jointed hinge and may be electrically connected to the base of the stimulating device by wires or other conductive elements that are arranged under the skin and, for example, through the multi-jointed hinge, so as to be connected to a controller device and a power source that are disposed within the base. The base may be the handle of the stimulating device.

Alternatively or in addition to motorized control, the degree of arcing of the stimulation members may be controlled by the manual spinning of rotary knobs disposed on the base of the stimulating device, in a manner similar to how rotary knobs may be used to change the rotation of the stimulation members.

FIG. 1 is a perspective view of a stimulating device in accordance with exemplary embodiments of the present disclosure. The stimulating device may include a handle portion 18 that is covered by a housing 10. A control module disposed within the handle portion 18 may include one or more buttons 20 that may be used to allow the user to control the device. The handle portion 18 may also include other input/output elements such as display screens, touchscreens, and the like.

The stimulating device may include a first stimulation member 12 and a second stimulation member 14. The two stimulation members 12 and 14 may be the same size or, as shown, the first stimulation member 14 may be longer than the second stimulation member 12. This length difference may be achieved, for example, by including more jointed rod elements 22 within the first stimulation member 12 than the second stimulation member 14. Each stimulation member 12 and 14 may include an elongated elastic component. For example, the first stimulation member 12 may include a first elongated elastic component 16. The elongated elastic components are shown as being disposed along the inside surface of the stimulation member (i.e., the first elongated elastic component 16 may face the second stimulation member 14). As mentioned above, pulling the first elongated elastic component 16 in the direction into the handle portion 18 results in the first stimulation member 12 arcing in the direction towards the second stimulation member 14 while pushing the first elongated elastic component 16 in the direction way from the handle portion 18 results in the first stimulation member 12 arcing in the direction away from the second stimulation member 14. The second stimulation member 14 may be set up as a mirror image of the first stimulation member 12 and so the directionality of the arcing would be mirrored as well.

The pulling and pushing of the elongated elastic components is performed by internal mechanical elements of the handle portion, as will be discussed in greater detail below.

Figure 2:
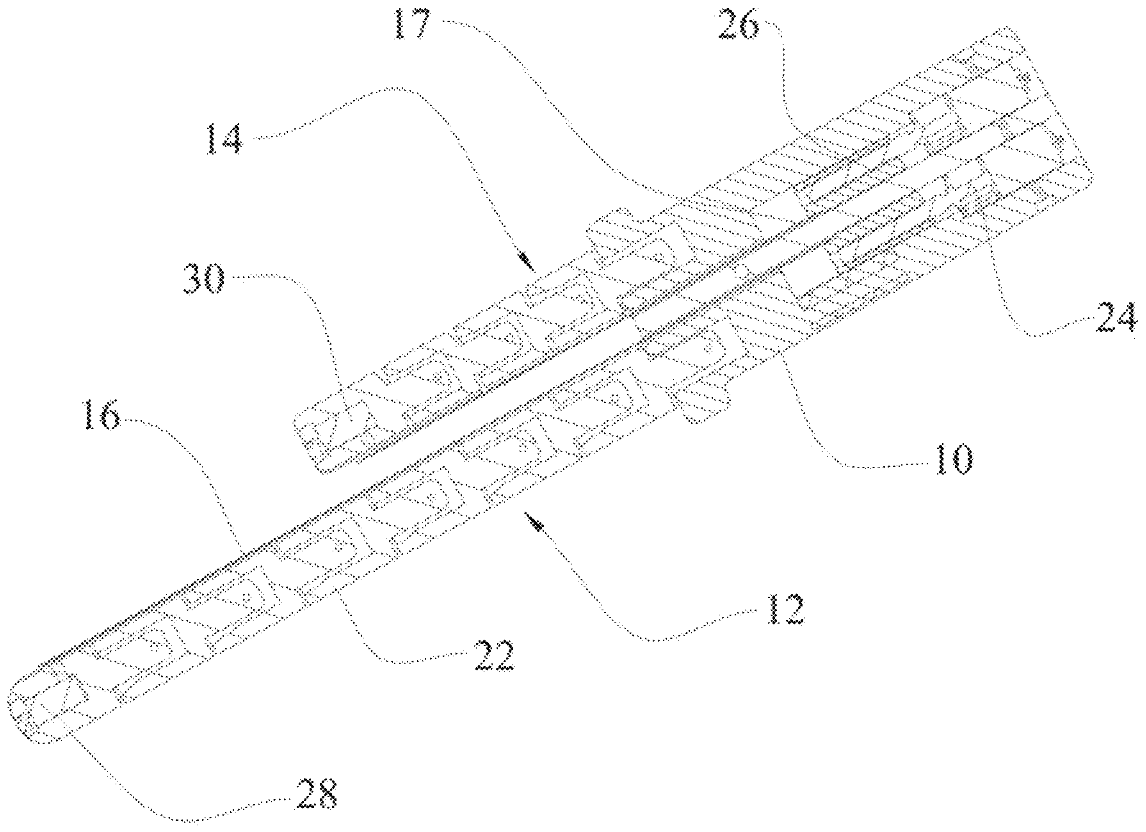
FIG. 2 is a cutaway view of a stimulating device in accordance with exemplary embodiments of the present disclosure.

FIG. 2 is a cutaway view of a stimulating device in accordance with exemplary embodiments of the present disclosure. As can be seen from this view, within the housing 10, a first drive unit 24 for driving the first stimulation member 12 may be disposed and a second drive unit 26 for driving the second stimulation member 14 may be disposed. The first elongated elastic component 16 is connected to the first drive unit 24 and the second elongated elastic component 17 is connected to the second drive unit 26. Each drive unit 24 and 26 controls the degree of extension of its corresponding elongated elastic component 16 and 17 and in this way, the arcing of the stimulation members may be controlled by the action of the drive units, which may be under the control of a control unit that is also disposed within the housing 10.

As can be seen from this figure, each rod 22 is hingedly connected either to the handle portion 18 or another rod 22 and this connection hinge allows for limited rotation backwards or forwards within a single plane. Within the forward-most rod of each stimulation member a stimulating component may be disposed. For example, the forward-most rod of the first stimulation member 12 may include a first stimulating component 28 disposed therein and the forward-most rod of the second stimulation member 14 may include a second stimulating component 30 disposed therein. Each stimulating component may be a vibrating motor.

Figure 3:
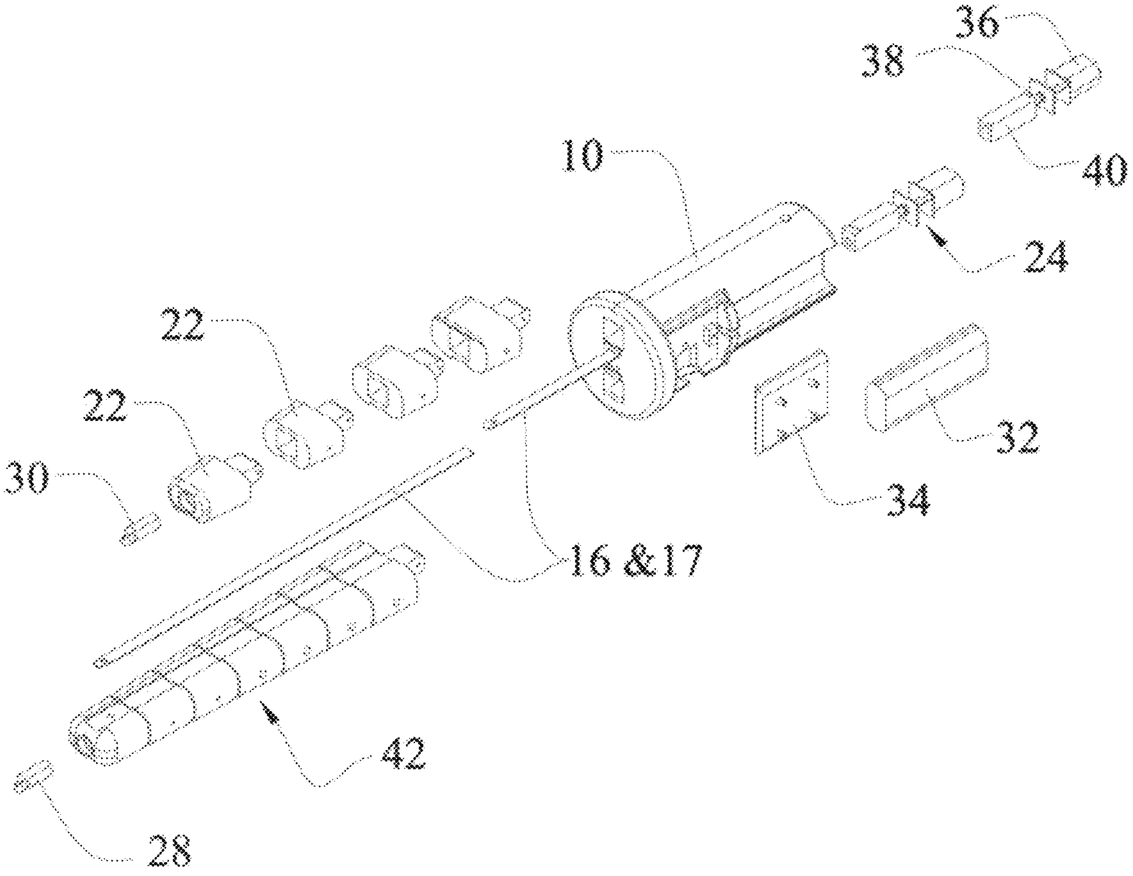
FIG. 3 is an exploded view of a stimulating device in accordance with exemplary embodiments of the present disclosure.

FIG. 3 is an exploded view of a stimulating device in accordance with exemplary embodiments of the present disclosure. As described above, the housing 10 includes a first drive unit 24 and a second drive unit 26. While these drive units are substantially identical to one another, different element are shown for each drive unit in the interest of providing a simplified representation but it is to be understood that each drive unit includes all of the elements shown for the other drive unit.

The second drive unit is shown as including a rotating motor 36 and a screw 38. The rotating motor 36 turns the screw 38 and in so doing either pulls in or pushes out the second elongated elastic component 17. The motors 36 are under the electrical control of a control module 34 that is also disposed within the housing 10 and electrical power is supplied to the motors 36 by a battery 32. The control module 34 may also include circuitry and ports for charging the battery 32 and may also include a processor, memory, data I/O functionality, and various other electronic components needed to implement the described functionality. For example, the control module 34 may include Bluetooth capability for communicating with a host smartphone or computer and flash memory for storing the aforementioned static positions and/or animated routines.

Each stimulation member may include a set of rods 22 that together form a multi-jointed hinge 42 that is capable of bending forward and backward in a plane. The forward-most rod of each stimulation member may include a cavity for receiving respective first and second stimulating components 28 and 30 and these stimulating components may be electrically connected to the control module 34 by wires or other conductors that run along or thorough the multi-jointed hinges 42.

The construction of the various rods 22 may be appreciated from this figure, with each rod being smaller than the next from the housing 10 to the forward-most rod. This gives each stimulation member a tapered shape, although some embodiments use commonly sized rods 22 and do not have the illustrated tapered shape. Moreover, each rod has a wide forward portion with a cavity and a narrow backward portion such that the narrow backward portion of one rod can mate within the cavity of the wide forward portion of the next rod, and so on. The narrow backward portion may have a pair of bumps that may engage with a corresponding pair of recesses within the cavity of the wide forward portion so that the two proximate rods may be snapped into one another, although the narrow backward portion may have the recesses while the cavity of the wide forward portion may have the bumps or both sections may have through holes for receiving a pin that is disposed through all through holes thereby creating the joint. Other arrangements may also be used and the instant invention is not necessarily limited to these approaches.

Moreover, the rods 22 may each have a channel so that the multi-jointed hinges 42 have channels for accommodating the elongated elastic components. The forward-most rods may also have a means of attachment for connecting the elongated elastic components thereto, such as an opening for a rivet that penetrates the elongated elastic component and affixes it to the forward-most rod.

The geometric arrangement of the top and bottom of each rod is designed so as to prevent side to side bending but permit front to back bending.

Figure 4:
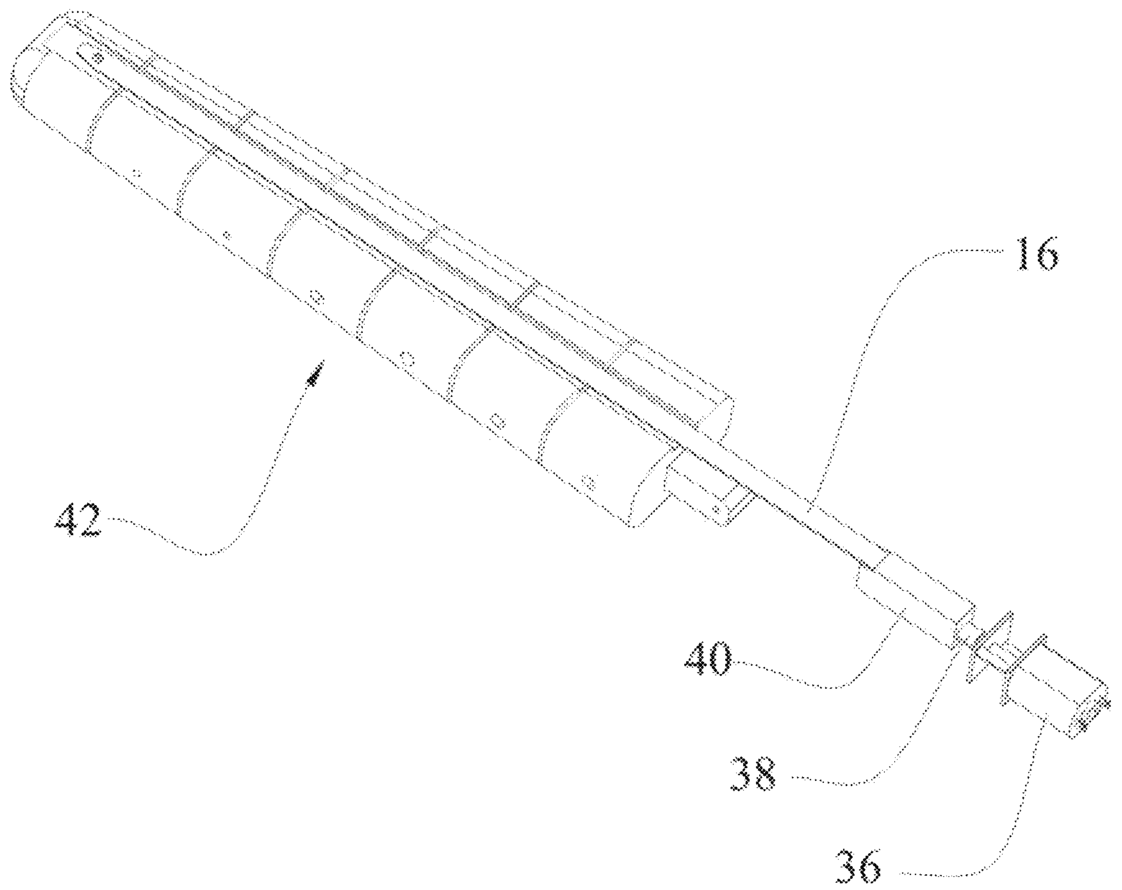
FIG. 4 is a perspective view illustrating a multi-jointed hinge in accordance with exemplary embodiments of the present disclosure.

FIG. 4 is a perspective view illustrating a multi-jointed hinge in accordance with exemplary embodiments of the present disclosure. As can be seen, the multi-jointed hinge 42 includes an elongated elastic component (e.g., a first elongated elastic component 16) that sits within the above-described channel and is fixed to the forward-most rod on a forward side and fixed to a nut 40 on the backward side. The nut 40 is threaded to a screw 38 and the nut 40 is mounted within the housing 10 so as to prevent it from rotating such that as the screw 38 rotates within the nut 40, the nut 40 is pushed either forward or backward. As the multi-jointed hinge 42 is prevented from moving forward and backward, for example, by hingedly joining the backward-most rod to the housing 10, the movement of the elongated elastic component 16 within the channel causes the arcing of the multi-jointed hinge 42. Physical or programmed means may be used to prevent over extension or over contraction of the elongated elastic component.

Figure 5:
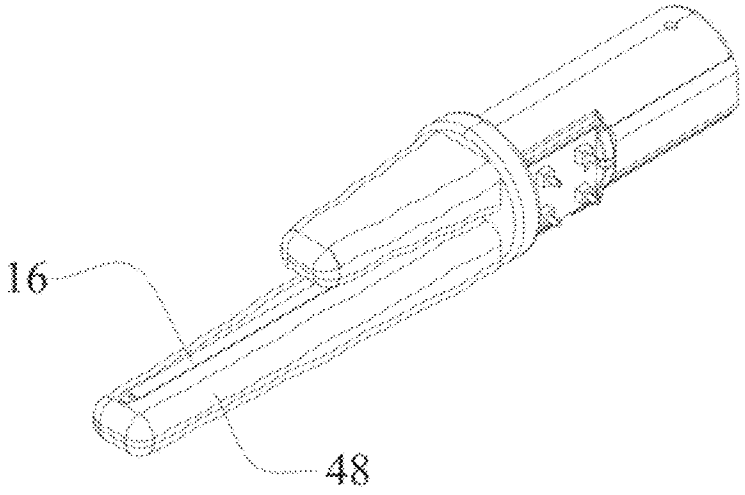
FIG. 5 is a perspective view of a stimulating device in accordance with an exemplary embodiment of the present disclosure.

FIG. 5 is a perspective view of a stimulating device in accordance with another embodiment of the present disclosure. According to this approach, each stimulation member 12 and 14 need not include multi-jointed hinges made of rods. Rather, each stimulation member may include a single malleable rod, for example, made of elastic plastic or metal with the elongated elastic components. In this embodiment, the malleable rods may be blocked from undesirable bending outside of the plane of arcing described above by the rigidity of the elongated elastic components or by some other means known in the art.

Figure 6:
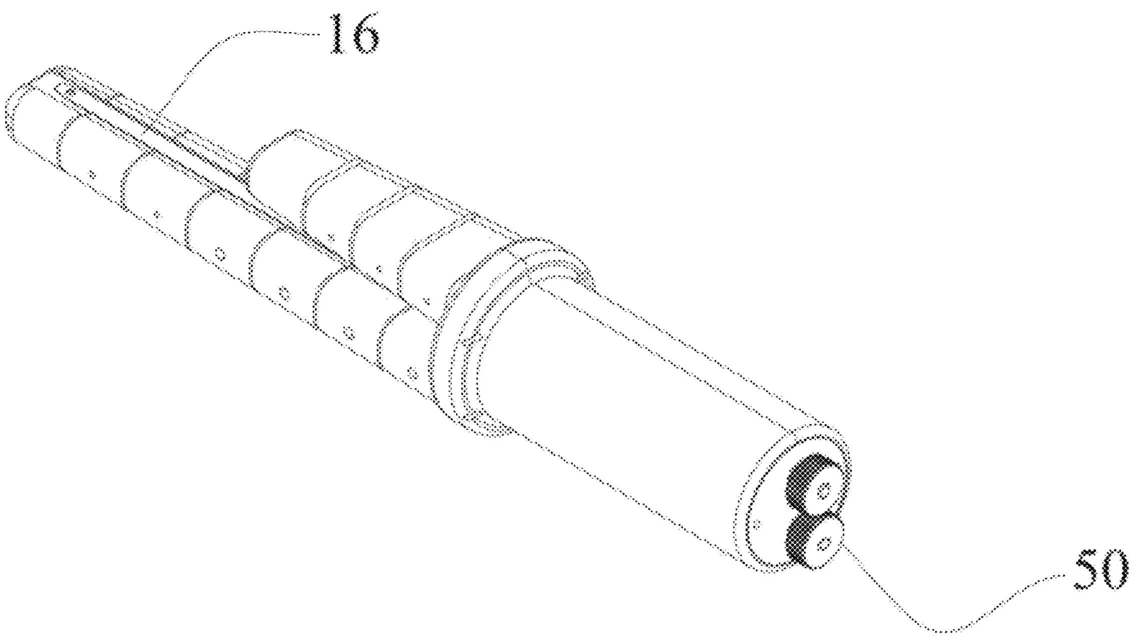
FIG. 6 is a perspective view illustrating a stimulating device including rotary knobs in accordance with exemplary embodiments of the present disclosure.

As mentioned above, rotary knobs may be used to manually extend and retract the elongated elastic components and/or rotary knobs may be used to manually rotate the plane of arcing of each stimulation member. FIG. 6 is a perspective view illustrating a stimulating device including rotary knobs in accordance with exemplary embodiments of the present disclosure. As can be seen from the above, there may be multiple rotary knobs and a first rotary knob 50 may be designed to rotate the plane of arcing of the first stimulation member 12 or to manually retract/extend the first elongated elastic component. When the first rotary knob 50 is used to retract/extend the first elongated elastic component, it may either be used as a manual override to the electronic components, used instead of the electronic components that may be omitted, as a means of fine tuning the extension with a degree of fineness that cannot be provided by the rotating motors, or as a means of calibrating the action of the rotating motors so as to ensure that the stimulation members actually extend straight when the control module believes that they are fully straightened.

According to some examples of the present disclosure, the rotary knobs are not mechanically linked to the screws but rather, are linked to potentiometers that electrically determine knob rotation and send a corresponding signal to the control module which then controls the corresponding drive unit in proportion to the spinning of the knob. In this way, the knobs to not physically control the bending of the stimulation members but rather operate as electronic controls for the bending of the stimulation members. Pressing in each knob may also constitute a control similar to a button.

Figure 7:
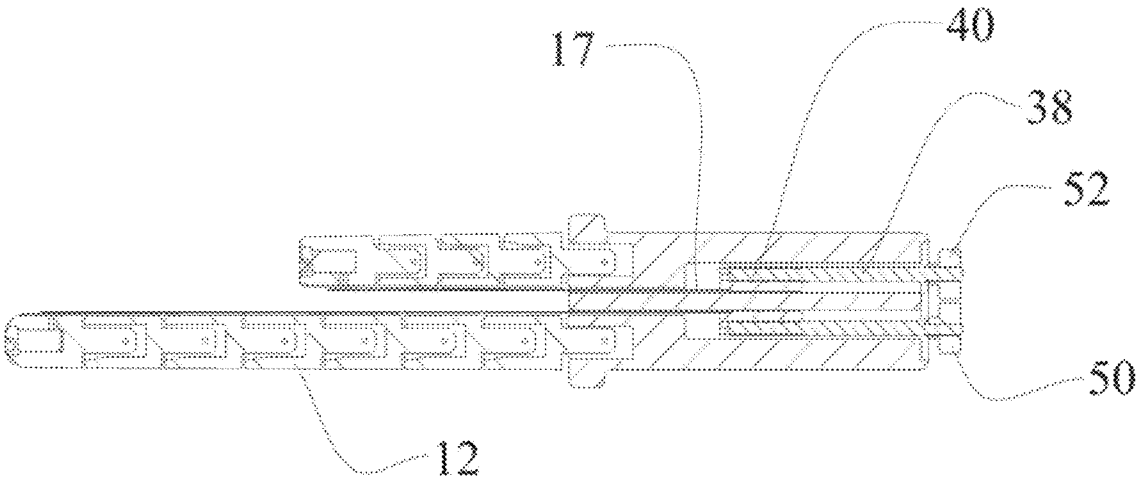
FIG. 7 is a cutaway view illustrating the stimulating device including rotary knobs as illustrated in FIG. 6.

FIG. 7 is a cutaway view illustrating the stimulating device including rotary knobs as illustrated in FIG. 6. This arrangement shows the use of a first rotary knob 50 and a second rotary knob 52 as a manual means of rotating the screw 38 in the absence of the rotating motors. Here, each rotary knob (e.g., 52) turns a corresponding screw (e.g., 38) and the screw turns within the nut (e.g., 40), which is prevented from rotation by its mounting within the housing such that the nut moves forward and backward as the knob is turned one way or the other way. The nut is affixed to the elongated elastic component (e.g., 17) and in this way the stimulation members are made to arc in the desired direction to the desired extent.

Figure 8:
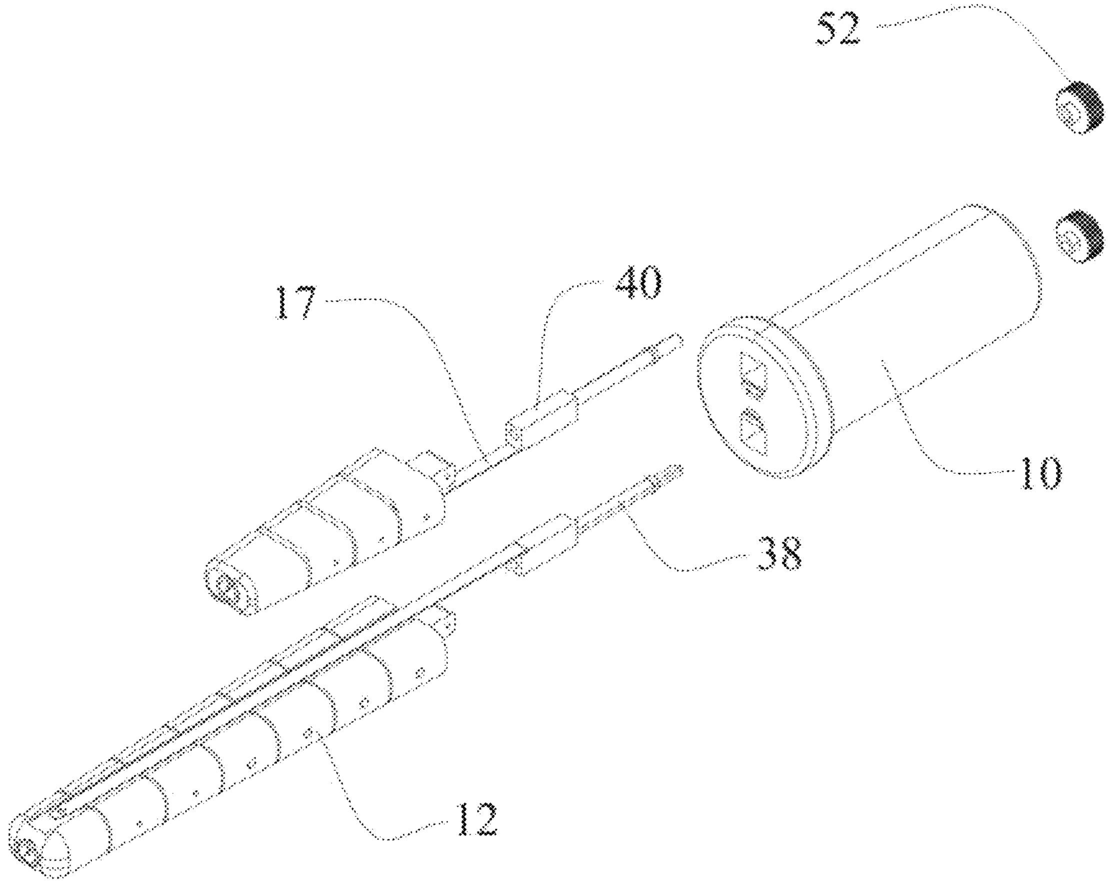
FIG. 8 is an exploded view of the stimulating device including rotary knobs as illustrated in FIG. 6.

FIG. 8 is an exploded view of the stimulating device including rotary knobs as illustrated in FIG. 6. As can be seen from this figure, the nut 40 and screw 38 are disposed within a cavity of the housing 10 so that the screw 38 connects directly to its corresponding knob (e.g., 52), through the housing.

Figure 9:
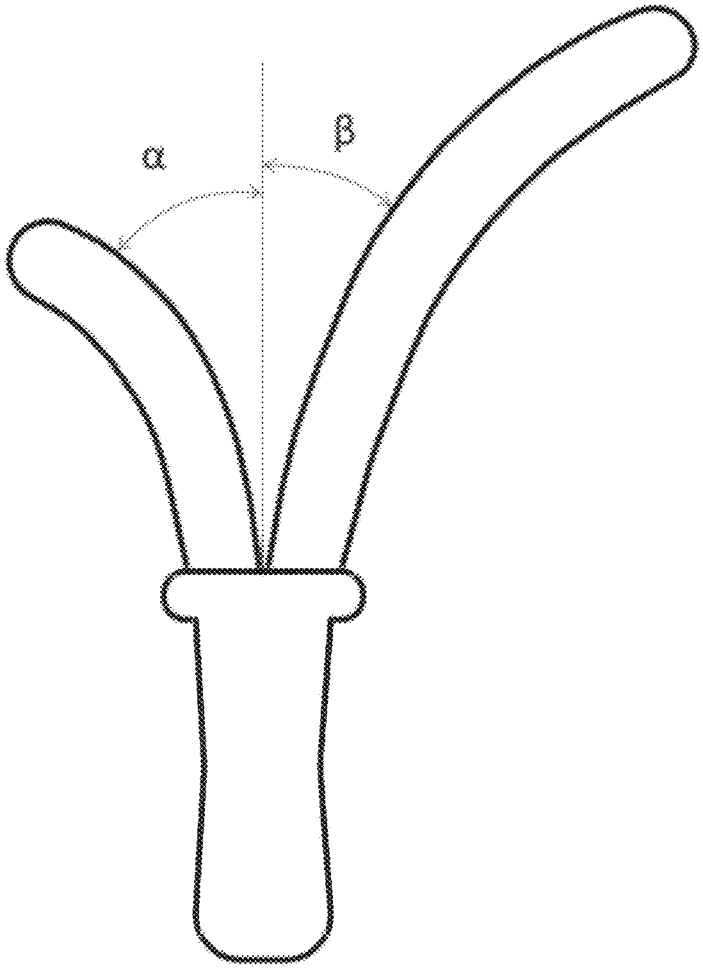
FIGS. 9 and 10 are diagrams illustrating a manner of arcing of the pair of stimulation members in accordance with exemplary embodiments of the present disclosure.
Figure 10:
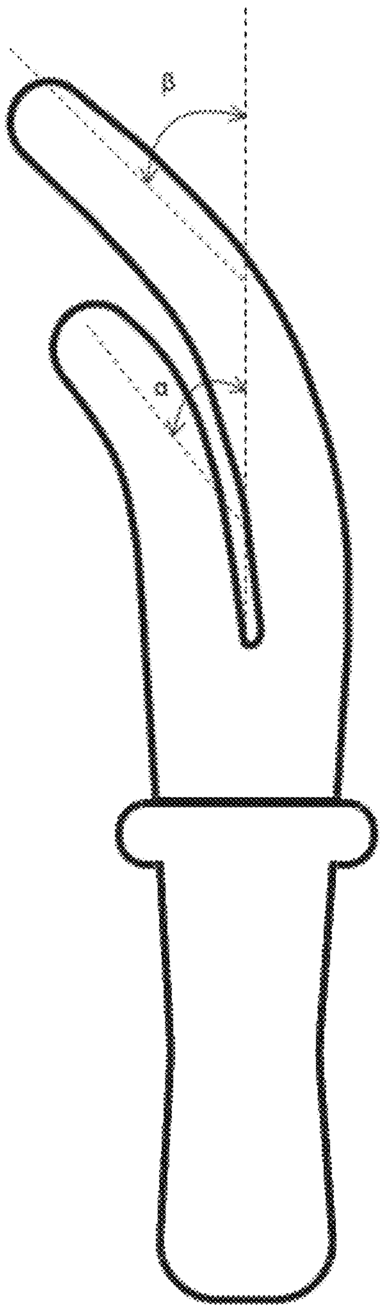

FIGS. 9 and 10 are diagrams illustrating a manner of arcing of the pair of stimulation members in accordance with exemplary embodiments of the present disclosure. As can be seen from FIG. 9, the stimulation members may be arced away from one another with the second (e.g., shorter) stimulation member achieving an angle $\alpha$ with respect to straight and the first stimulation member (e.g., longer) achieving an angle $\beta$. As seen in this figure, the second stimulation member has an angle $\alpha$ that may be defined as positive, where straight is the angle zero and the first stimulation member has an angle $\beta$ that may be defined as negative.

As can be seen from FIG. 10, the stimulation members may be arced in the same direction as one another with the second (e.g., shorter) stimulation member achieving an angle $\alpha$ with respect to straight and the first stimulation member (e.g., longer) achieving an angle $\beta$. As seen in this figure, the second stimulation member has an angle $\alpha$ that may be defined as positive, where straight is the angle zero and the first stimulation member has an angle $\beta$ that may also be positive.

While it might be possible for both stimulation members to be arced toward one another, as mentioned above, this motion may be mechanically or software limited to prevent the stimulation members from pushing into one another.

Figure 11:
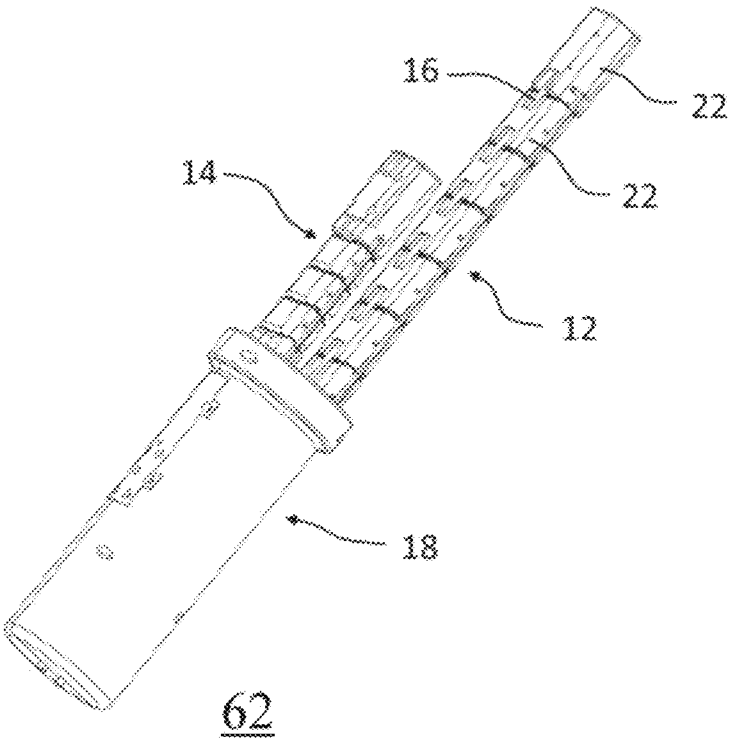
FIG. 11 is an illustration showing a perspective view and a cutaway view of a stimulating device in accordance with an exemplary embodiment of the present disclosure.
Figure 11:
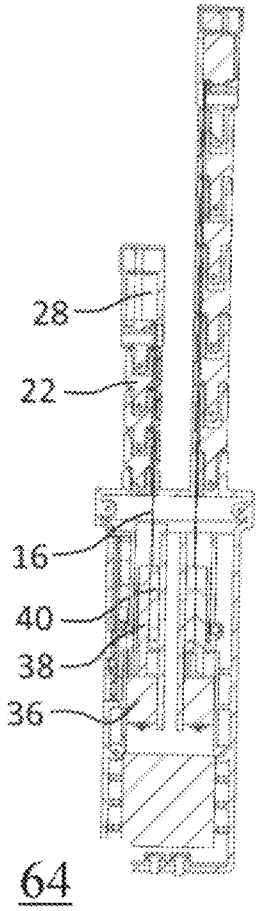

FIG. 11 is an illustration showing a perspective view 62 and a cutaway view 64 of a stimulating device in accordance with an exemplary embodiment of the present disclosure. As can be seen here, the elongated elastic components 16 (and 17) are disposed within the stimulation member 12 and 14, rather than on their outer surface, and the rods 22 are shaped with the cavity of the wide forward portion having a tapered top opening that allows for limiting the bending of each rod with respect to the prior rod.

By disposing the elongated elastic components 16 and 17 within the stimulation member 12 and 14, rather than on their outer surface, the middle rods (those rods other than the farthest from the handle) may be prevented from bowing out and away from the corresponding elongated elastic component 16 or 17.

The above-mentioned taper may be identical for each rod so that the multi-jointed hinge arcs evenly or the taper may be adjusted for each rod so that more arcing can be achieved towards the front (forward side) of the stimulation members than toward the back (handle side) of the stimulation member. The placement of the battery as occupying an entirety of the lower section of the handle is shown and two charging pins are also shown on the bottom of the handle so as to facilitate charging of the battery, for example, by inserting the handle into a charging dock.

Figure 12:
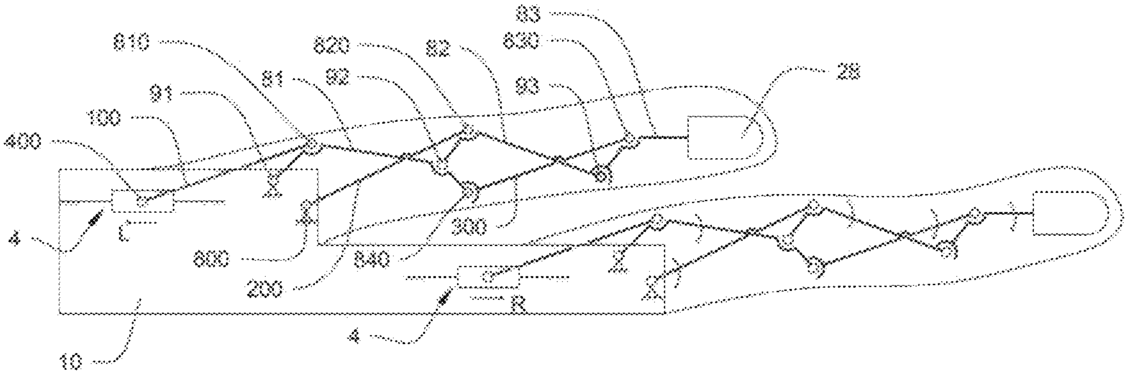
FIG. 12 is a simplified drawing of mechanical structure of a stimulating device in accordance with exemplary embodiments of the present disclosure.

FIG. 12 is a simplified drawing of mechanical structure of a stimulating device in accordance with exemplary embodiments of the present disclosure. As can be seen from this view, within the housing 10, a first drive unit for driving the first stimulation member 12 may be disposed and a second drive unit for driving the second stimulation member 14 may be disposed, and the drive units may each be linear reciprocating mechanisms 4.

In the depicted figure, each stimulation member 12 and 14 is equipped with a set of rods and a driving assembly including at least one rigid driving rod, and the figure allows for an observation of the distinct construction of these rods. Notably, each stimulation member 12 and 14 may include three rods. The first rod 81 is connected to a main body of the handle portion 18 via a first hinge pin 91, establishing a coupling. Similarly, a second hinge pin 92 facilitates the connection between the first rod 81 and the second rod 82. Moreover, a third hinge pin 93 enables the coupling of the second rod 82 with the third rod 83. Collectively, these rods form a multi-jointed hinge 80.

From this view, it is apparent that stimulation members 14 and 16 may further include three rigid driving rods that link the linear reciprocating mechanisms 4 to the various rods and hinge pins, for example, a first rigid driving rod 100, a second rigid driving rod 200, and a third rigid driving rod 300. Furthermore, a third rod 83, positioned at the forefront of the multi-jointed hinge, may encompass a stimulating component, such as a vibrating motor 28.

The proximal end of the first rigid driving rod 100, can be rotatably connected to a hinge shaft 400 that is part of the linear reciprocating mechanism 4, and the distal end of the first rigid driving rod 100, may be rotatably connected to the first rod 81 via a first hinge point 810.

The proximal end of the second rigid driving rod 200, can be rotatably connected to the handle portion 18 via a fifth hinge point 800, which may be fixed to the distal end of the handle portion 18. Furthermore, the distal end of the second rigid driving rod 200, can be rotatably connected to the second rod 82 via a second hinge point 820.

The distal end of the third rigid driving rod 300 can be rotatably connected to the third rod 83 via a third hinge point 830, which may be secured to the third rod 83. Furthermore, the proximal end of the third rigid driving rod 300 can be rotatably connected to the first rod 81 via a fourth hinge point 840, which may be fixed to the first rod 81.

Regarding the second stimulation member 14, when the linear reciprocating mechanism 4 is activated, the hinge shaft 400 moves linearly in the direction indicated by the L arrow in FIG. 12. This linear motion causes the first rigid driving rod 100 to drive the first rod 81 to rotate in a counterclockwise direction relative to the first hinge pin 91.

The counterclockwise rotation of the first rod 81 further drives the second rigid driving rod 200 to rotate in a counterclockwise direction with respect to the fifth hinge point 800. Similarly, it may also drive the third rigid driving rod 300 to rotate in a counterclockwise direction with respect to the third hinge point 830. The counterclockwise rotating second rigid driving rod 200 then drives the second rod 82 to rotate in a counterclockwise direction relative to the second hinge pin 92. Finally, the second rod 82, in cooperation with the counterclockwise rotation of the third rigid driving rod 300, causes the third rod 83 to rotate in a counterclockwise direction relative to the third hinge point 830.

As a result of the actions of the interconnected rods, the second (e.g., shorter) stimulation member 14 achieves a specific orientation, making an angle α with respect to a straight centerline, which is defined as an inwardly curl, as shown in FIG. 9. The described mechanism enables the transmission and conversion of linear motion into rotational motion through the interconnected rods and hinge points, allowing for the controlled positioning of the stimulus member to any desired extent.

Regarding the first stimulation member 12, when a linear reciprocating mechanism 4 is activated, the hinge shaft 400 moves linearly in the direction indicated by the R arrow in FIG. 12. This linear motion causes the first rigid driving rod 100 to drive the first rod 81 to rotate in a clockwise direction relative to the first hinge pin 91.

The clockwise rotation of the first rod 81 further drives the second rigid driving rod 200 to rotate in a clockwise direction with respect to the fifth hinge point 800. Similarly, it also drives the third rigid driving rod 300 to rotate in a clockwise direction with respect to the third hinge point 830. The clockwise rotating second rigid driving rod 200 then drives the second rod 82 to rotate in a clockwise direction relative to the second hinge pin 92. Finally, the second rod 82, in cooperation with the clockwise rotation of the third rigid driving rod 300, causes the third rod 83 to rotate in a clockwise direction relative to the third hinge point 830.

As a result of the actions of the interconnected rods, the first (e.g., longer) stimulation member 12 achieves a specific orientation, making an angle β with respect to a straight centerline, which is defined as an outwardly curl, as shown in FIG. 9. The described mechanism enables the transmission and conversion of linear motion into rotational motion through the interconnected rods and hinge points, allowing for the controlled positioning of the first stimulation member 12.

Figure 13:
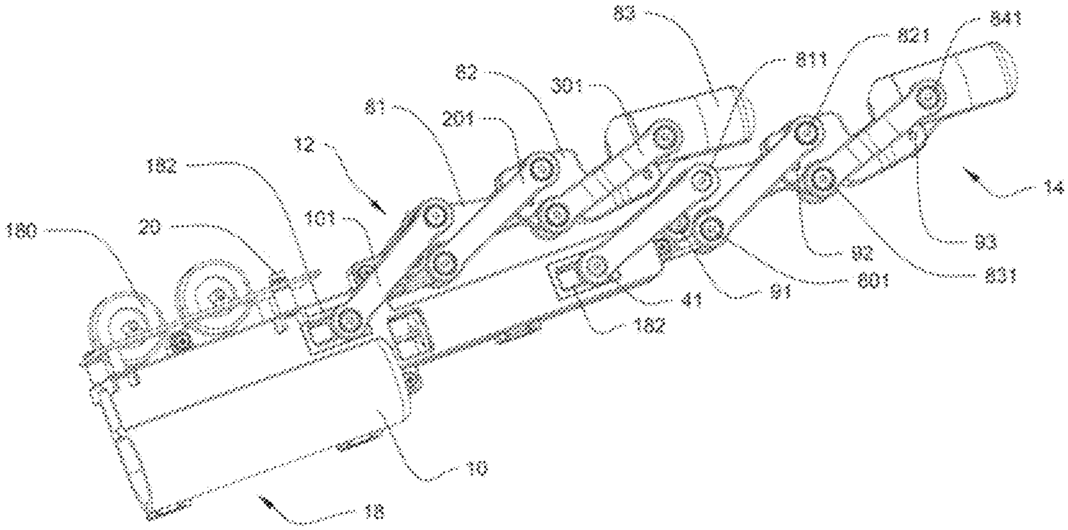
FIG. 13 is a perspective view of a stimulating device in accordance with exemplary embodiments of the present disclosure.

As a specific embodiment, FIG. 13 is a perspective view of a stimulating device in accordance with exemplary embodiments of the present disclosure. The stimulating device may include a handle portion 18. A control module disposed within the handle portion 18 may include one or more buttons 20 and/or one or more rotary knobs 180 that may be used to allow the user to control the device. The handle portion 18 may also include other input/output elements such as display screens, touchscreens, and the like.

Figure 14:
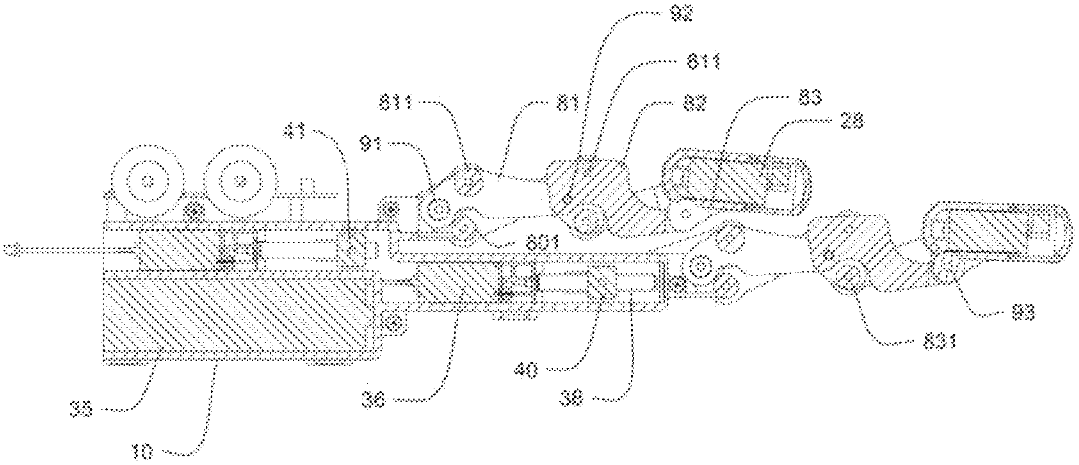
FIG. 14 is a cutaway view of a stimulating device in accordance with exemplary embodiments of the present disclosure.
Figure 15:
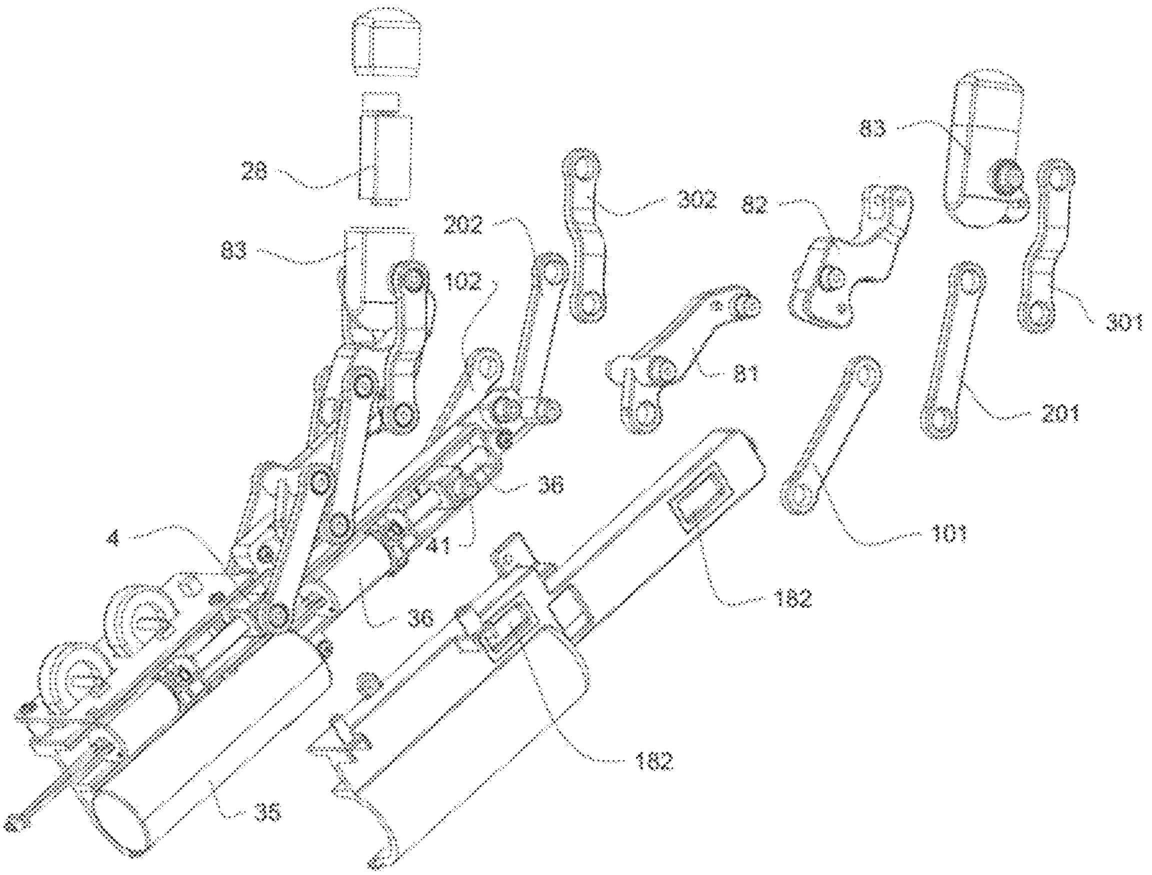
FIG. 15 is an exploded view of a stimulating device in accordance with exemplary embodiments of the present disclosure.

The arrangement of rods and hinge pins may be well appreciated from this figure with the linear reciprocating mechanisms being shown at elements 182 which are guide slots as discussed below with respect to FIG. 15. The rods are shown by elements 101, 201, and 301. The hinge points are shown by elements 41, 811, 801, 821, 831, and 841. FIG. 14 is a cutaway view of a stimulating device in accordance with exemplary embodiments of the present disclosure. The stimulating device may include a first stimulation member 12 and a second stimulation member 14. The two stimulation members 12 and 14 may be the same size or, as shown, the first stimulation member 14 may be longer than the second stimulation member 12. This length difference may be achieved, for example, by moving the second stimulation member 14 back a distance in the direction of where the handle portion 18 is located.

The reference numerals depicted here represent corresponding elements to what has already been shown. However, it is noted that the power source here may be a rechargeable battery 35. FIG. 15 is an exploded view of a stimulating device in accordance with exemplary embodiments of the present disclosure. As can be seen from this view, within the housing 10, a first drive unit for driving the first stimulation member 12 and a second drive unit for driving the second stimulation member 14 may be disposed. Each drive unit includes a nut 40 threaded to a screw 38 and the nut 40 is mounted within the housing 10 so as to prevent it from rotating such that as the screw 38 rotates within the nut 40, the nut 40 is pushed either forward or backward. In the handle portion 18, there are a pair of guide slots 182 specifically positioned to align with the movement path of the nut 40. These guide slots 182 correspond to a pair of shafts 41 that are located on either side of the nut 40 and pass through their respective guide slots 182. Notably, these shafts 41 have the capability to slide linearly along the guide slots 182 as the nut 40 engages in linear movement. Each stimulation member 14 and 16 may include three rods each. The first rod 81 is connected to a main body of the handle portion 18 via a first hinge pin 91, thereby establishing a coupling. Similarly, a second hinge pin 92 facilitates the connection between the first rod 81 and the second rod 82. Moreover, a third hinge pin 93 enables the coupling of the second rod 82 with the third rod 83. Collectively, these rods form a multi-jointed hinge.

From these views, it is apparent that stimulation members 14 and 16 further include three pairs of rigid driving rods each. The proximal end of two first rigid driving rods 101 and 102 can be rotatably connected to the pair of shafts 41 that are part of the nut 40. Furthermore, the distal end of these two first rigid driving rods 101 and 102, can be rotatably connected to a first rod 81 via a pair of first hinge points 811, which are fixed near the upper portion of the first rod 81.

The proximal end of two second rigid driving rods 201 and 202 can be rotatably connected to the handle portion 18 via a pair of fifth hinge points 801, which are fixed to both sides of the distal end of the handle section 18. Furthermore, the distal end of these two second rigid driving rods 201 and 202, can be rotatably connected to a second rod 82 via a pair of second hinge points 821, which are fixed near the upper portion of the second rod 82.

The distal end of these two third rigid driving rods 301 and 302, can be rotatably connected to a third rod 83 via a pair of third hinge points 831, which are secured to either side of the third rod 83. Furthermore, the proximal end of two third rigid driving rods 301 and 302, can be rotatably connected to the first rod 81 via a pair of fourth hinge points 841, which are fixed to both sides of the distal end of the first rod 81.

The third rod 83, positioned at the forefront of each stimulation member 12 and 14, encompasses a cavity designed to accommodate the respective first and second stimulating components, such as vibrating motors. These stimulating components, in turn, can be electrically connected to the control module 34 through the utilization of wires or other conductors. These wires or conductors traverse the multi-jointed hinges, either running alongside them or passing through them.

FIGS. 16A-16F are views illustrating various morphologies of a stimulating device in accordance with exemplary embodiments of the present disclosure. Through separate operation of the first and second drive units by the user, the first and second stimulation members 12 and 14 can bend into various forms, as illustrated in FIGS. 16A-16F. This bending is made possible by their respective plurality of rigid driving rods which are configured to drive the bending of the multi-jointed hinge. By bending into different shapes, the vibration motors 28 and 30 located at the end of each stimulation member can simultaneously come into contact with different erogenous zones of the human body. This allows for targeted and simultaneous stimulation of multiple areas.

Figure 16A:
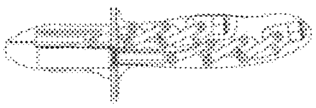
FIGS. 16A-16F are views illustrating various morphologies of a stimulating device in accordance with exemplary embodiments of the present disclosure.
Figure 17:
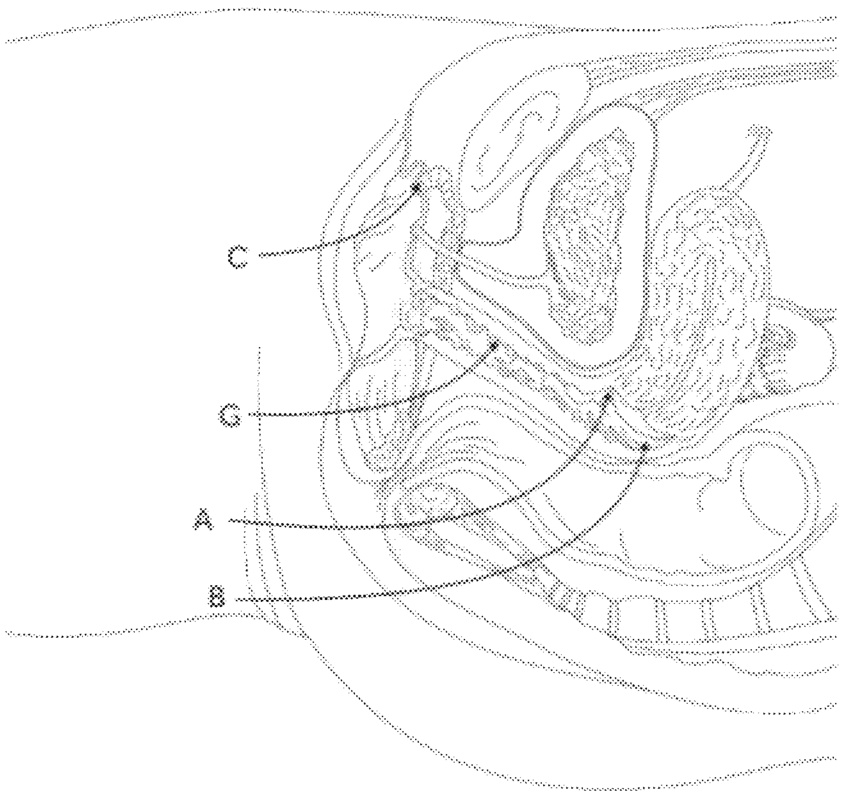
FIG. 17 is an anatomical diagram illustrating various anatomical locations that may be stimulated by the flexile stimulating device in accordance with exemplary embodiments of the present disclosure.

In an initial state, as shown in FIG. 16A, the first and second stimulation members 12 and 14 can be arranged close together and inserted into a user's body (e.g., a female vagina or a male/female anus). While the first and second stimulation members 12 and 14 are inserted within the user's body, the first and second stimulation members 12 and 14 can, depending on the user's operation, be capable of realizing a change in morphology when they are inside the user's body to enable the vibration motors to stimulate a specific sexually sensitive area (e.g., the A-point, B-point, C-point and G-point of the FIG. 17) within the user's body. FIG. 17 is therefore an anatomical diagram illustrating various anatomical locations that may be stimulated by the flexile stimulating device in accordance with exemplary embodiments of the present disclosure.

Figure 16B:
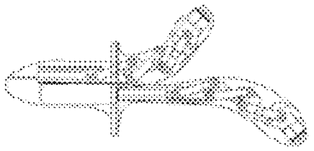
Figure 16C:
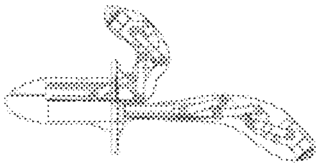
Figure 16D:
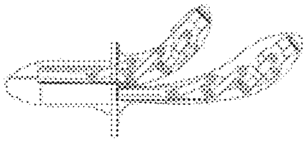
Figure 16E:
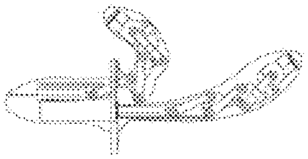
Figure 16F:
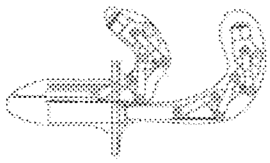

The stimulation mode as shown in FIG. 16B can stimulate the G-point and the B-point at the same time, the stimulation mode as shown in FIG. 16C can stimulate the C-point and the B-point at the same time, the stimulation mode as shown in FIG. 16D can stimulate the G-point and the A-point at the same time, the stimulation mode as shown in FIG. 16E can stimulate the C-point and the A-point at the same time, the stimulation mode as shown in FIG. 16F can stimulate the C-point and the G-point at the same time.

In order to avoid the stimulating device not being able to be pulled out of the user's body due to the changed morphology that may occur one inside the body, a panic button can be provided, and this panic button, when operated, can force the first and second stimulation members 12 and 14 to return to their initial state (e.g., put the first and second stimulation members 12 and 14 together), so as to enable the user to more easily remove the stimulating device without any problem. The panic button can, but is not necessarily limited to being, be a power switch that enables the first and second stimulation members 12 and 14 to be restored to their initial state when the stimulating device is powered down, and it will be appreciated that this scenario may be implemented upon a determination that the battery is nearly depleted. In one embodiment, pressure sensors may be arranged on the surfaces of the stimulation appendages 12 and 14 to detect whether they are inside a human body, and if both the stimulation appendages 12 and 14 have been inserted a human body, to limit the extent to which the stimulation appendage 12 are curled, for example, to avoid the stimulus appendages 12 from being flexed into the form of FIGS. 16C, 16E, and 16F.

While exemplary embodiments of the present disclosure have largely been described in terms of electronic control of the stimulation members, the present disclosure is not necessarily limited thereto, and the stimulation members may be manually adjusted by the user by applying sufficient force to bend each stimulation member 12 and/or 14 into its desired shape. Furthermore, when the user bends the stimulation members 12 and/or 14 into the desired shape, the corresponding position of the nut 40 can be stored in the storage module of the sexual stimulating device through user input. This facilitates the direct bending of the stimulating device into the desired shape based on the user's input whenever it is required for future use. Thus, the desired arrangement may be detected and electronically stored for later use. As discussed above, the control module may include a set of buttons. These buttons may include (but are not necessarily limited to including) a first button for controlling the movement of the first stimulation member, a second button for controlling the vibration of the first stimulation member, a third button for controlling the movement of the second stimulation member, and a fourth button for controlling the movement of the second stimulation member. Each button may have an LED light disposed in its proximity so as to illuminate the button for more easy discovery. The control module may additionally include a power LED that may turn a particular color to show power and another color to show Bluetooth connection. Other controls may be used to lock stimulation member movement, toggle through vibrational modes, toggle through programmed static positions and/or animated routines, record a static position or animated routine, etc. In one embodiment, the first stimulation appendage 12 can be controlled by a first button. The second stimulation appendage 14 can be controlled by a second button. The first button and the second button can be located at different positions in the handheld section such as the two rotary knobs 180 in FIG. 13, or have different shapes, or have different tactile sensations, resulting in the user being able to blindly operate two stimulus appendages 12 and 14 based on two buttons.

As discussed above, a display may be provided for I/O and this display may include a touch screen. The stimulating device may be paired with a host device such as a smartphone or computer for more control functionality and to setup remote control. The display and/or indicator LEDs may also be used to show battery level and the need for recharging. Vibration patterns may also be used to communicate status to the user such as to provide a tactile low battery warning at one or more progressive states of discharge.

Figure 18:
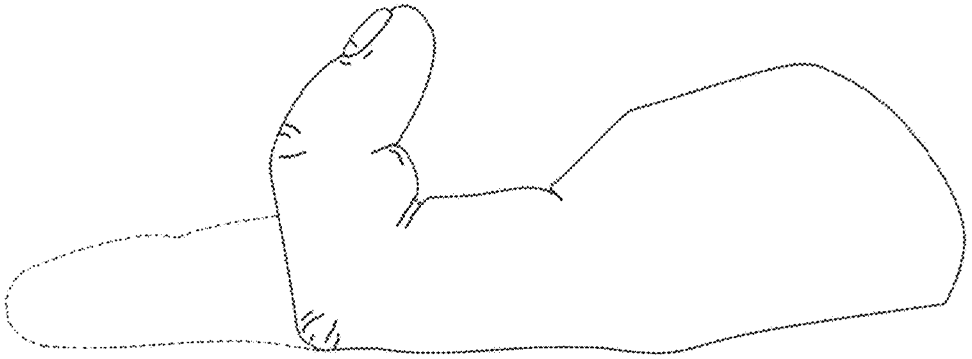
FIG. 18 is a schematic diagram of a finger movement associated with the use of a stimulating device in accordance with exemplary embodiments of the present disclosure.

FIGS. 19-28B illustrate an example of a sexual stimulating device (which may also be referred to herein as a stimulation device, a sexual stimulation device, or a stimulating device) which is generally of a rabbit vibrator style, and which has a finger portion that can be controlled to move in a hooking motion similar to the finger motion illustrated in FIG. 18, to stroke, and/or press, and/or vibrate against, and/or otherwise stimulate a body part of a user, such as the G-spot or the prostate.

Figure 19:
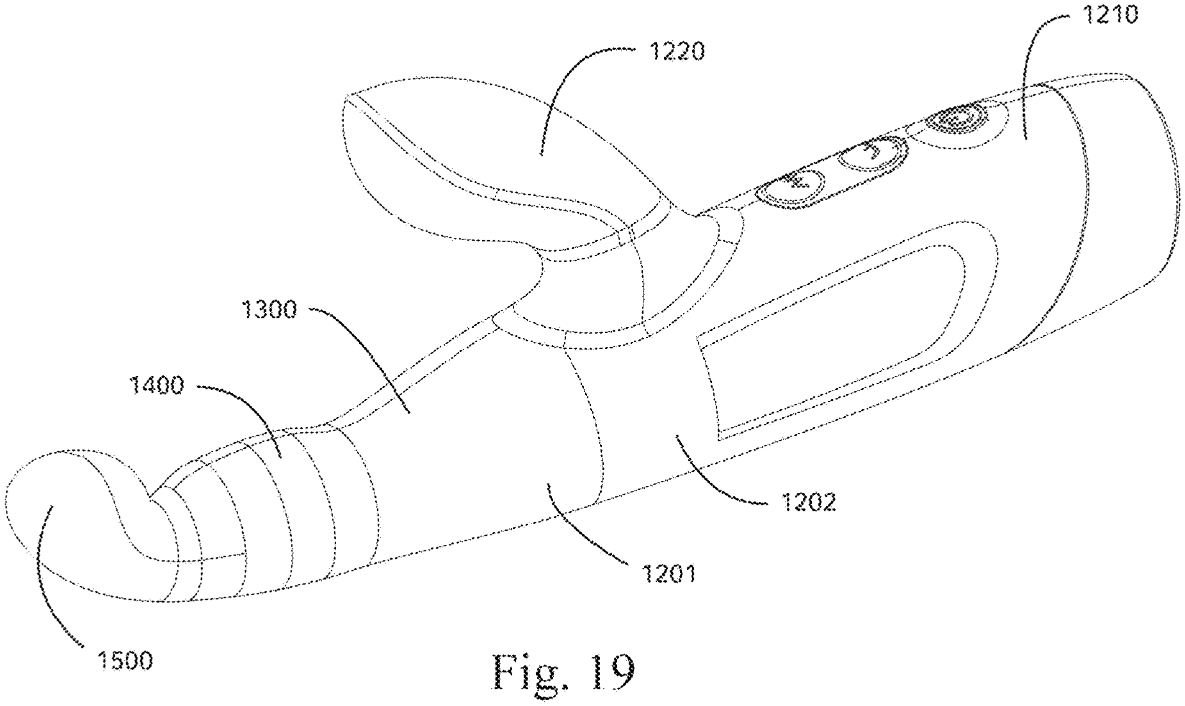
FIG. 19 is a perspective view of a stimulating device in accordance with exemplary embodiments of the present disclosure.
Figure 24A:
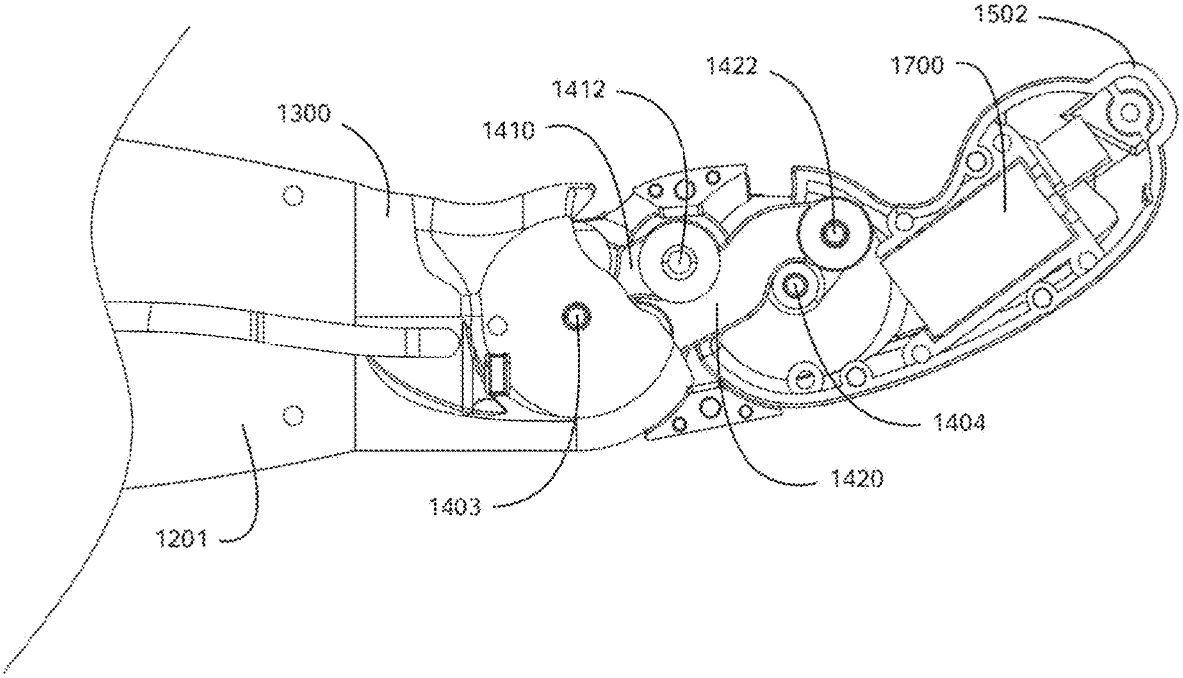
FIGS. 24A-24C are schematic views of a finger component of an exemplary stimulating device of the present disclosure during activity.
Figure 24B:
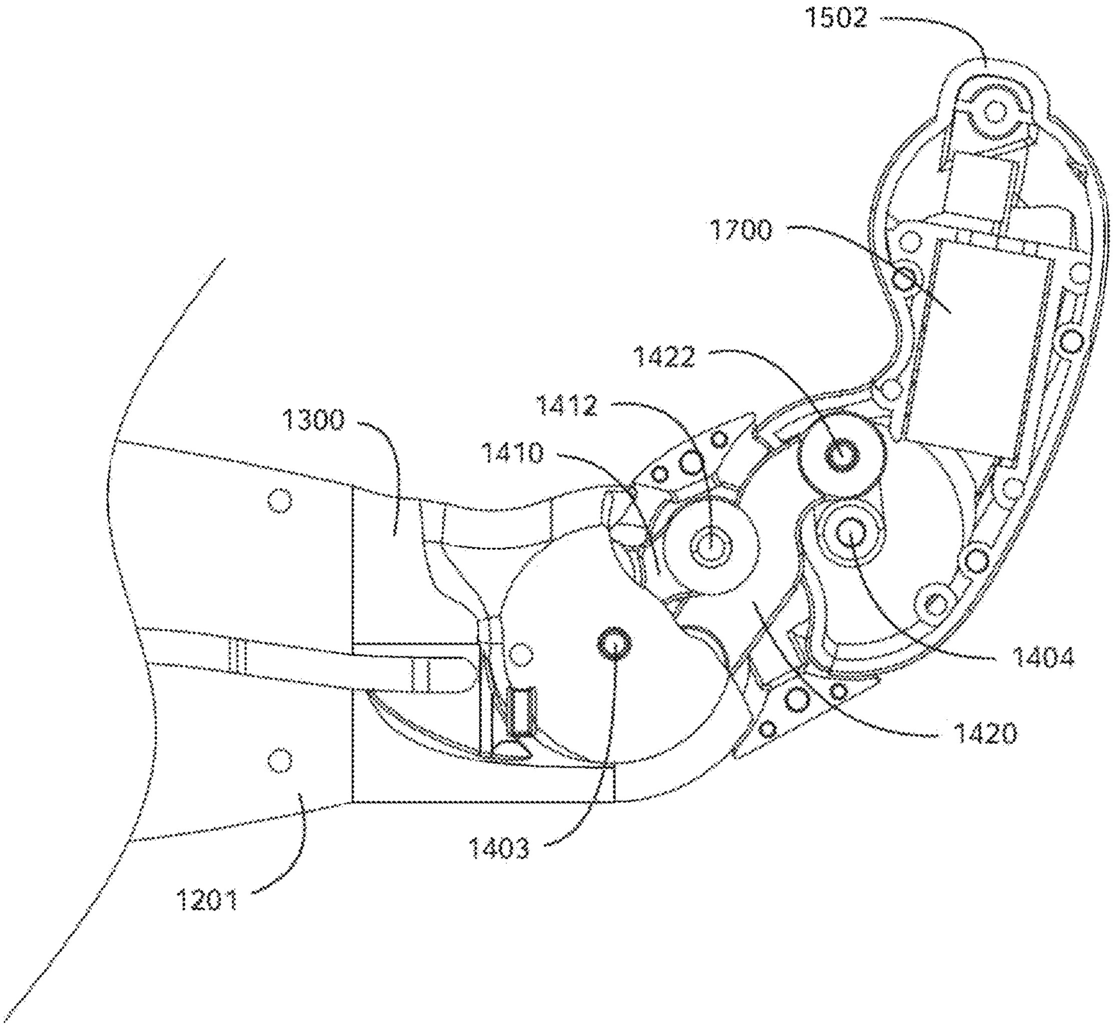
Figure 24C:
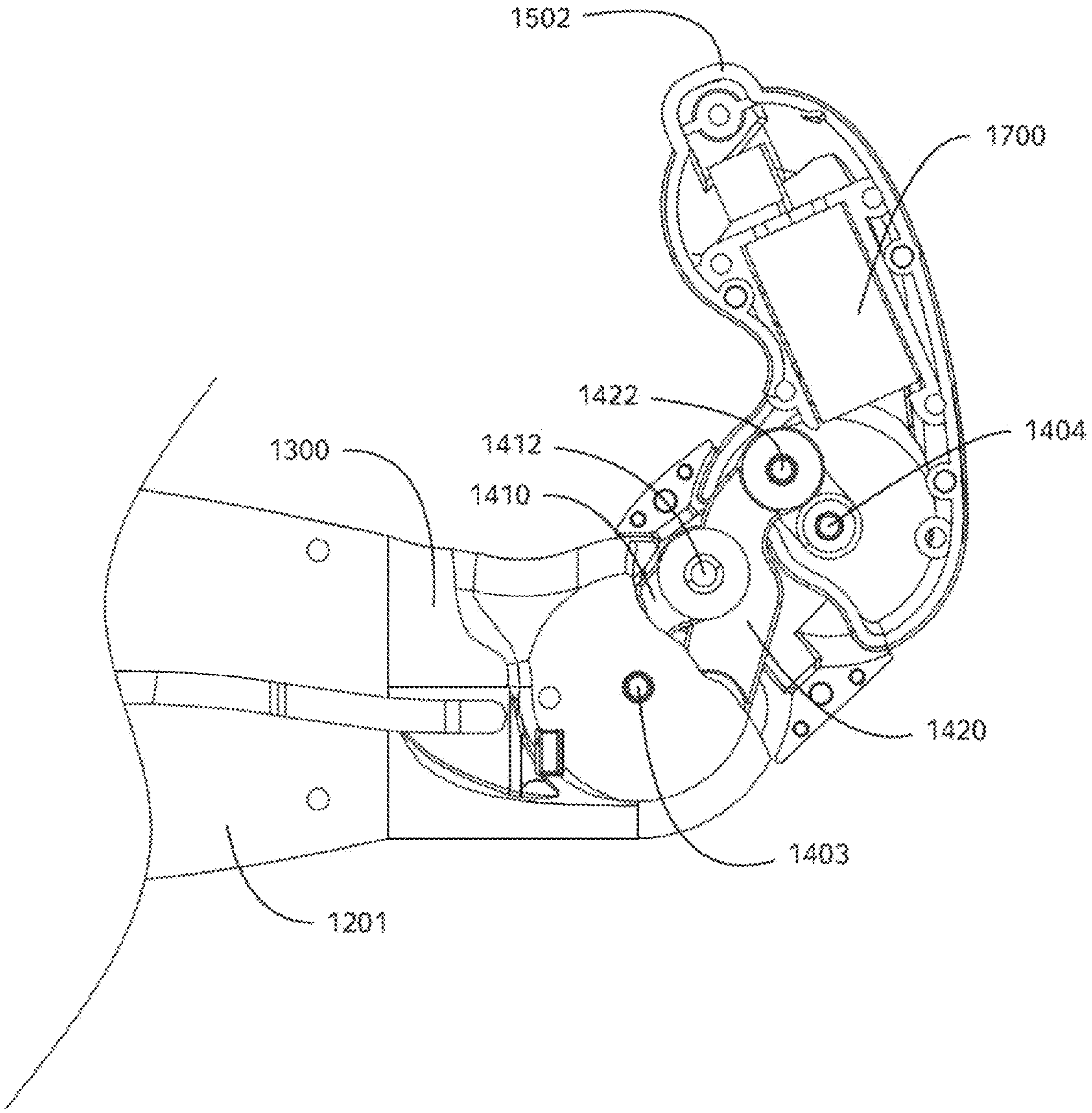
Figure 24D:
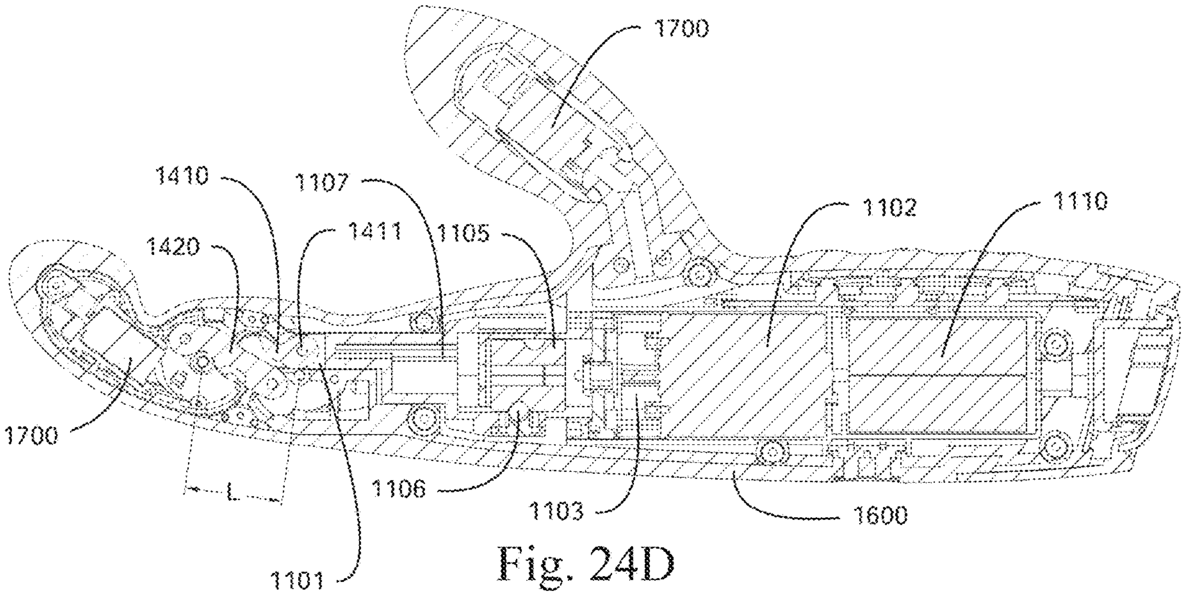
FIG. 24D is a cross-sectional view of the exemplary stimulating device.
Figure 28A:
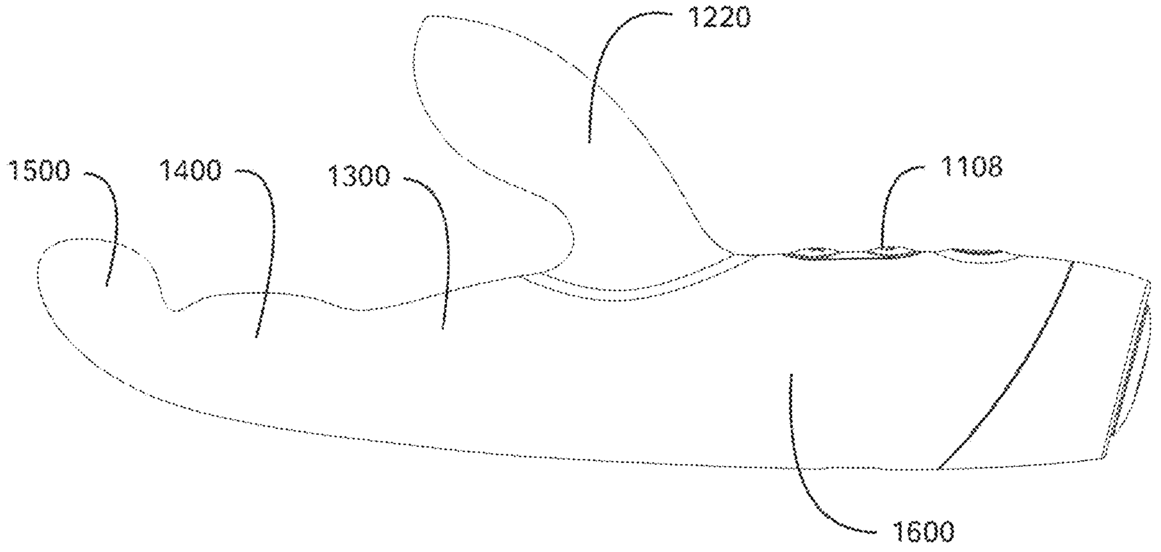
FIGS. 28A and 28B are schematic views of an exemplary stimulating device of the present disclosure in an extended state and a hooked up state of a bionic finger assembly, respectively.
Figure 28B:
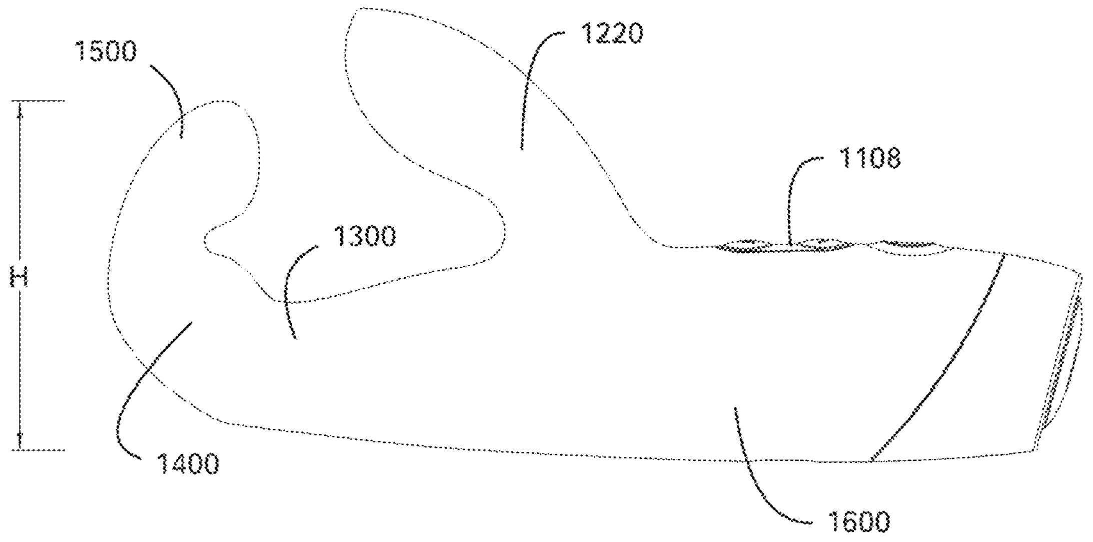

Referring to FIGS. 19 and 24D, the stimulating device in at least some embodiments may include a main body 1200, having a first end portion 1201 and a second end portion 1202. In one embodiment, the second end portion 1202 may have a handle portion 1210 and an arm portion 1220, with a built-in vibration motor in the arm portion 1220, and the first end portion 1201 may have a proximal component 1300. The arm portion 1220, with or without a built-in vibration motor, can operate as a stimulation member to stimulate a body part of a user, such as the clitoris. The proximal component 1300 may be coupled to an intermediate component 1400 which may in turn be coupled to a distal component 1500. The distal component 1500 may also have a built-in vibration motor. The proximal component 1300, the intermediate component 1400, and the distal component 1500 collectively form a bionic finger assembly 1900 configured to be inserted into a human body orifice such as a male's anus or a female's vaginal opening. The bionic finger assembly 1900 may be referred to simply as a finger assembly, and components 1300, 1400, and 1500 of the bionic finger assembly may be referred to as phalangeal components or phalanx components. As shown in FIGS. 28A and 28B and explained in detail below, the bionic finger assembly 1900 can be controlled to move in a hooking motion similar to the finger motion illustrated in FIG. 18, to stroke, and/or press, and/or vibrate against, and/or otherwise stimulate a body part of a user, such as the G-spot or the prostate. The bionic finger assembly 1900, with or without a built-in vibration motor in the distal component 1500, can thus function as another stimulation member to stimulate a body part of a user, such as the G-spot or prostate.

As shown in FIG. 19, the bionic finger assembly 1900 and at least a portion of the main body 1200 may be covered by a flexible cover member 1600. Portions of the sexual stimulating device that are covered by the flexible cover member 1600 in at least some embodiments can be understood by comparing FIGS. 19 and 24D, which illustrate the sexual stimulating device with the flexible cover member 1600, with FIGS. 20A and 21, which illustrate the sexual stimulating device without showing the flexible covering 1600.

The bionic finger assembly 1900 can be controlled to move in a repeated motion of hooking upward and extending flat or partially flat (an animated routine, as described above), or can be controlled to be positioned in a static position (also discussed above). In some embodiments, the arm portion 1220 can also move in animated routines and/or assume static positions. The animated routines and static positions of the bionic finger assembly 1900 and/or the arm portion 1220 as stimulation members can be set by the user, or can be selected from among various animated routines and static positions stored in the device.

For example, as described above, the movement and positions of the bionic finger assembly 1900 and optionally the arm portion 1220 can be electronically implemented so that the user may quickly and easily switch between multiple presets that the user has programmed or customized, or that are stored in the device as manufactured. Presets may be programmed either by inputting instructions though an electronic device such as a smartphone or a computer that might be paired to the stimulating device, or by placing the stimulating device into a learning mode whereby either a static position or an animated routine is recorded as it is controlled by the user so that the user may playback a recorded static arrangement or animated routine. Additionally, the stimulating device may be preprogrammed for a range of different static positions and/or animated routines. In some embodiments, the user may directly control the bionic finger assembly 1900 and optionally the arm portion 1220 to move or to assume a certain static position without relying on presets, by inputting commands to direct the finger portion to move in a certain repeating motion or to assume a certain static position. In some embodiments, the user can directly and manually manipulate the arm portion 1220 and/or the bionic finger assembly 1900 with his or her hands, to position the arm portion 1220 and/or the bionic finger assembly 1900.

According to some embodiments of the present disclosure, the stimulating device may be remotely controllable, for example, over a wide area network such as the Internet, so that a second user may control the desired arrangement of the bionic finger assembly 1900 and/or the arm portion 1220 so as to stimulate the first user in a desired fashion. This may be done using a control panel that is accessible over a website or a mobile application, the control panel mirroring the buttons of the stimulating device and/or providing a user interface to select from between preprogramed static positions and/or animated routines.

Moreover, the first user of the stimulating device may be a content creator (e.g., a live streamer) and remote control of the stimulating device may be granted to a viewer of the content by way of an online control panel that is accessible to the viewer. This control may be provided automatically upon the satisfaction of predetermined conditions such as the issuance of a monetary tip from the second user to the content creator, with different functionality being provided to the control of the second user based on a set of tiered conditions.

Figure 20A:
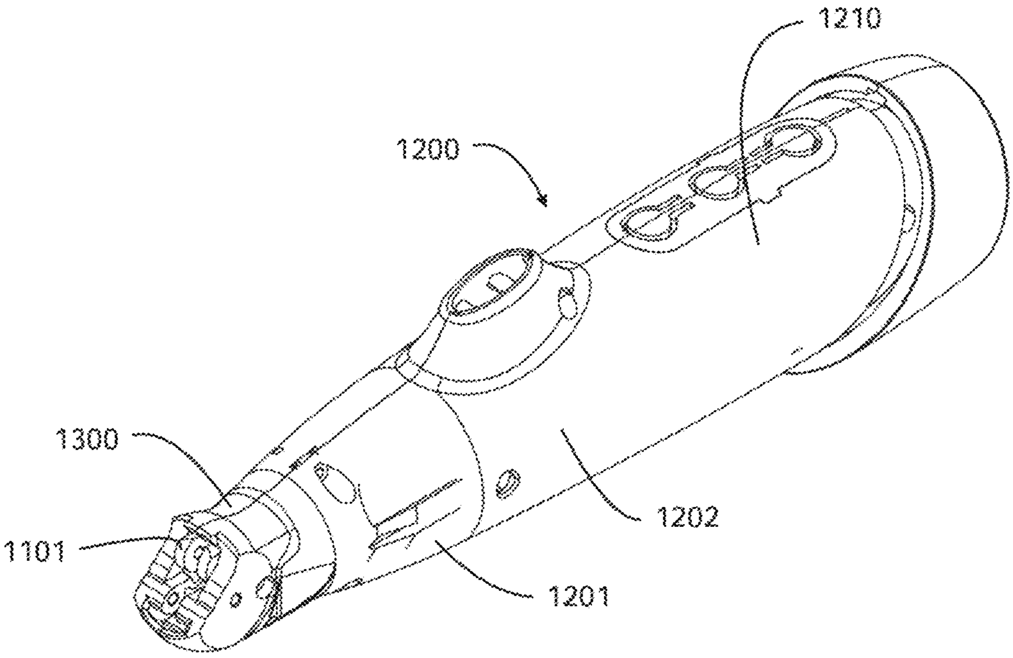
FIGS. 20A and 20B are perspective and exploded views, respectively, of a main body of an exemplary stimulating device of the present disclosure.
Figure 20B:
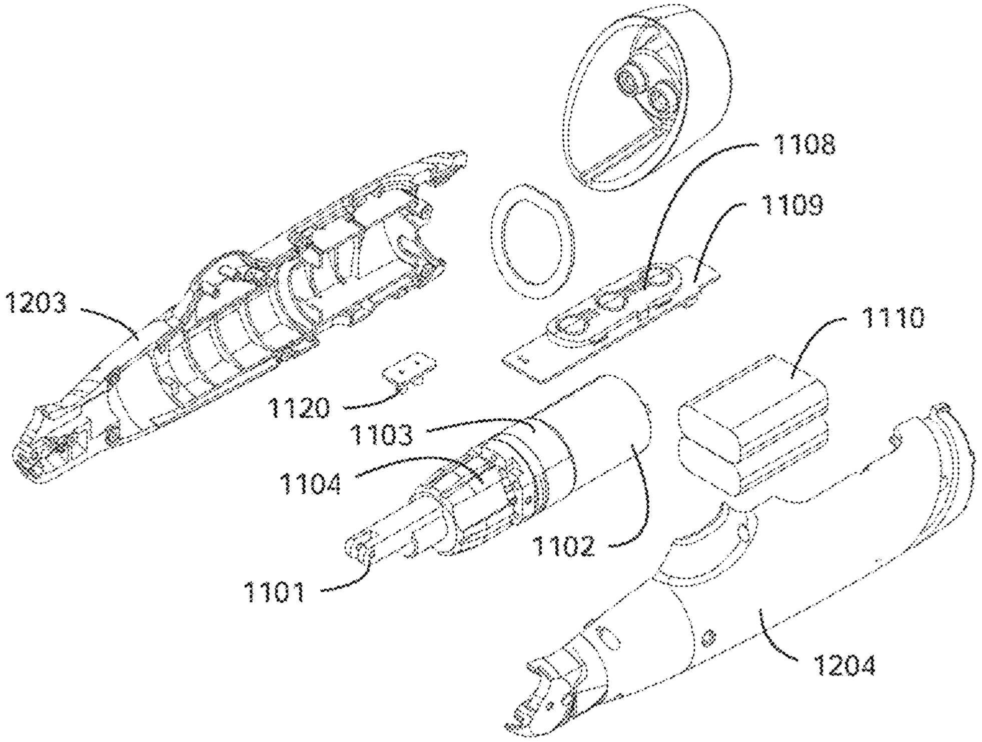
Figure 21:
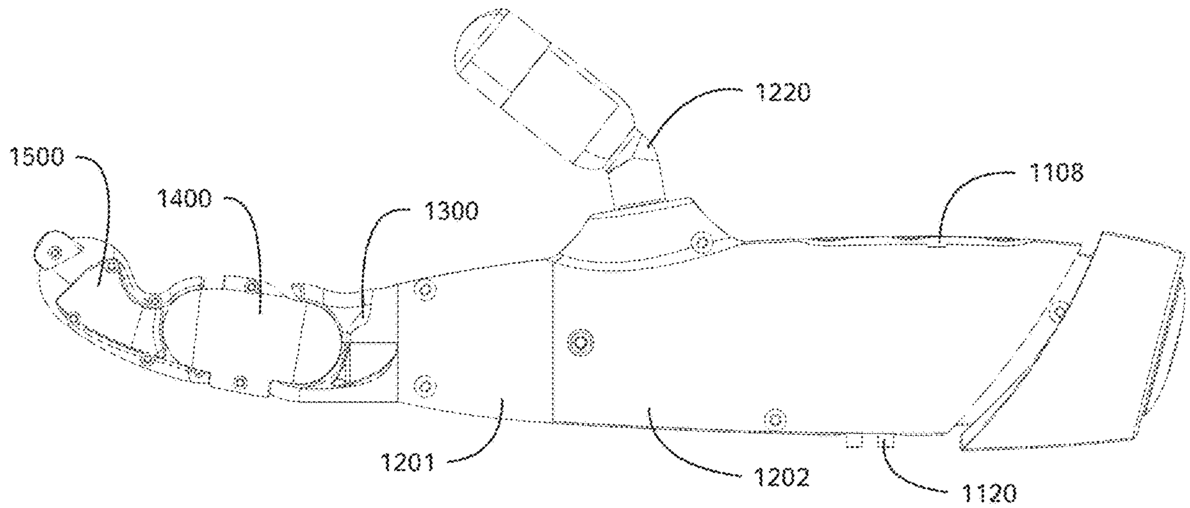
FIG. 21 shows a schematic view of an exemplary stimulating device of the present disclosure when it is not encased in a flexible covering member.

Referring to FIG. 20A, which illustrates the main body 1200 not encased by the flexible covering member 1600, the main body 1200 may extend or project at the first end portion 1201 to form the proximal component 1300. Referring to FIG. 20B, in one embodiment, the main body 1200 may include a first housing 1203 and a second housing 1204 which fit together to form a housing of the main body 1200 with an interior hollow portion. The interior hollow portion may house, for example, an actuator 1100, a battery 1110, and a control circuit 1109. See also FIG. 24D. The actuator 1100 operates under control of the control circuit 1109. The control circuit 1109 may include circuitry and ports for charging the battery 1110 and may also include a processor, memory, data I/O functionality, and various other electronic components needed to implement the described functionality. For example, the control module 1109 may include Bluetooth capability for communicating with a host smartphone or computer and flash memory for storing the aforementioned static positions and/or animated routines.

A charging contact 1120 (e.g., a magnetic charging contact) can also be provided in the interior hollow portion, for charging the battery 1110. See FIG. 20B. See also FIG. 21, which illustrates a sexual stimulating device that is not encased by the flexible covering 1600, and which shows ends of the charging contact 1120 projecting from inside the housing to outside of the housing of the main body 1200. The battery 1110 may be any suitable power source. For example, the battery 1110 may be a rechargeable lithium-ion battery that may be externally connected to a power source (e.g., an electrical outlet, an external battery, and/or any other suitable power source) for recharging via the charging contact 1120. In at least some exemplary embodiments, the battery 1110 may be a lithium polymer battery. Battery 1110 may also be a nickel-metal hydride battery, a supercapacitor battery, a lead-acid battery, a nickel-cadmium battery, or any other suitable power source.

In addition, as shown in FIGS. 20A and 20B, one or more one or more input assemblies 1108 can be provided at or in a surface of the main body 1200, preferably at the handle portion 1210, to allow a user to provide inputs (e.g., control commands) to the control circuit 1109. In some embodiments, the input assembly 1108 can be used to control motion of the bionic finger assembly 1900 and/or the arm 1220, or to select preset animated routines or static positions as discussed above. The input assembly 1108 can also include a power on/off button or switch to turn the sexual stimulating device on and off. The input assembly (or assemblies) 1108 can be mounted on the control circuit 1109, or can be provided separately from the control circuit 1109 and connected to the control circuit 1109 by wires, conductive leads, or other ways known in the art. The input assembly 1108 can be mounted to a surface of the housing of the main body 1200 or can be exposed in an opening of the housing as shown in FIG. 20B. In either case, as shown in FIG. 19, portions of the input assembly 1108 can be covered by the flexible covering 1600, leaving exposed, for example, only portions to be touched or viewed by a user for input or output purposes. The input assembly 1108 can include one or more of a touch screen, a display screen, one or more buttons, one or more switches, one or more dials, and/or any other suitable input or I/O mechanism. As discussed above, the stimulating device may be paired with a host device such as a smartphone or computer for more control functionality and to setup remote control. A display and/or indicator LEDs may also be used to show battery level and the need for recharging. Vibration patterns may also be used to communicate status to the user such as to provide a tactile low battery warning at one or more progressive states of discharge.

As shown in FIGS. 20B and 24D, the actuator 1100 may include a rotary motor 1102, a gearbox 1103, which may be a reduction gearbox 1103, a linear reciprocating mechanism 1104, and a power output end portion 1101. The reduction gearbox 1103 may be coupled to a rotational shaft of the rotary motor 1102, and the linear reciprocating mechanism 1104 may be coupled to an output shaft of the reduction gearbox 1103. The linear reciprocating mechanism 1104, when driven by the rotary motor 1102 via the reduction gearbox 1103, generates a reciprocating motion of the power output end portion 1101.

The linear reciprocating mechanism 1104 may employ one of a cylindrical cam mechanism, a crank-slider mechanism, a slot linkage mechanism, one of a crank linkage mechanism, and a screw nut reciprocating mechanism. In at least some exemplary embodiments, referring to FIG. 24D, the linear reciprocating mechanism 1104 employs a cylindrical cam mechanism, which may include a cylindrical cam 1105 coupled to an output shaft of the reduction gearbox 1103, a ball 1106 coupled to a slide groove on the cylindrical cam 1105, and a linear motion member 1107 coupled to the ball 1106. The power output end portion 1101 may be disposed at the linear end of the linear motion member 1107. As shown in FIG. 20A, the power output end portion 1101 can be provided to (e.g., within) the proximal component 1300 formed by the extending (or projecting) end of the first end portion 1201 of the main body 1200.

Referring to FIGS. 21-27, the intermediate component 1400 may be connected to the proximal component 1300 formed by the extending (or projecting) end of the first end portion 1201 of the main body 1200. Connecting the intermediate component 1400 to the proximal component may include connecting the intermediate component 1400 to the power output end portion 1101 provided to the proximal component 1300, or to both the power output end portion 1101 and a housing of the proximal component 1300. The distal component 1500 may be connected to the intermediate component 1400.

In one embodiment, the intermediate component 1400 may have a first proximal portion 1401 and a first distal portion 1402, and the distal component 1500 may have a second proximal portion 1501 and a second distal portion 1502. The first proximal portion 1401 of the intermediate component 1400 may be hinged to an end portion of the proximal phalanx joint 1300 at a proximal interphalangeal joint 1403 (FIGS. 24A-24D), thereby enabling the intermediate component 1400 to rotate about the proximal interphalangeal joint 1403. The second proximal portion 1501 of the distal component 1500 may be articulated with the first distal portion 1402 of the intermediate component 1400 at a distal interphalangeal joint 1404 (FIG. 24A), thereby enabling the distal component 1500 to rotate about the distal interphalangeal joint 1404.

Figure 22A:
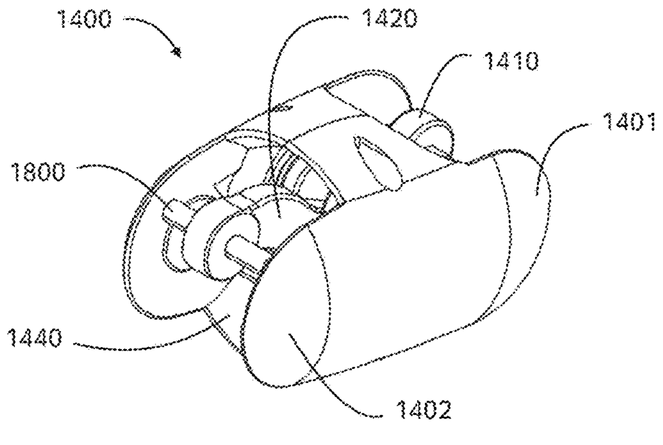
FIGS. 22A and 22B are perspective and exploded views, respectively, of an intermediate component of an exemplary stimulating device of the present invention.
Figure 22B:
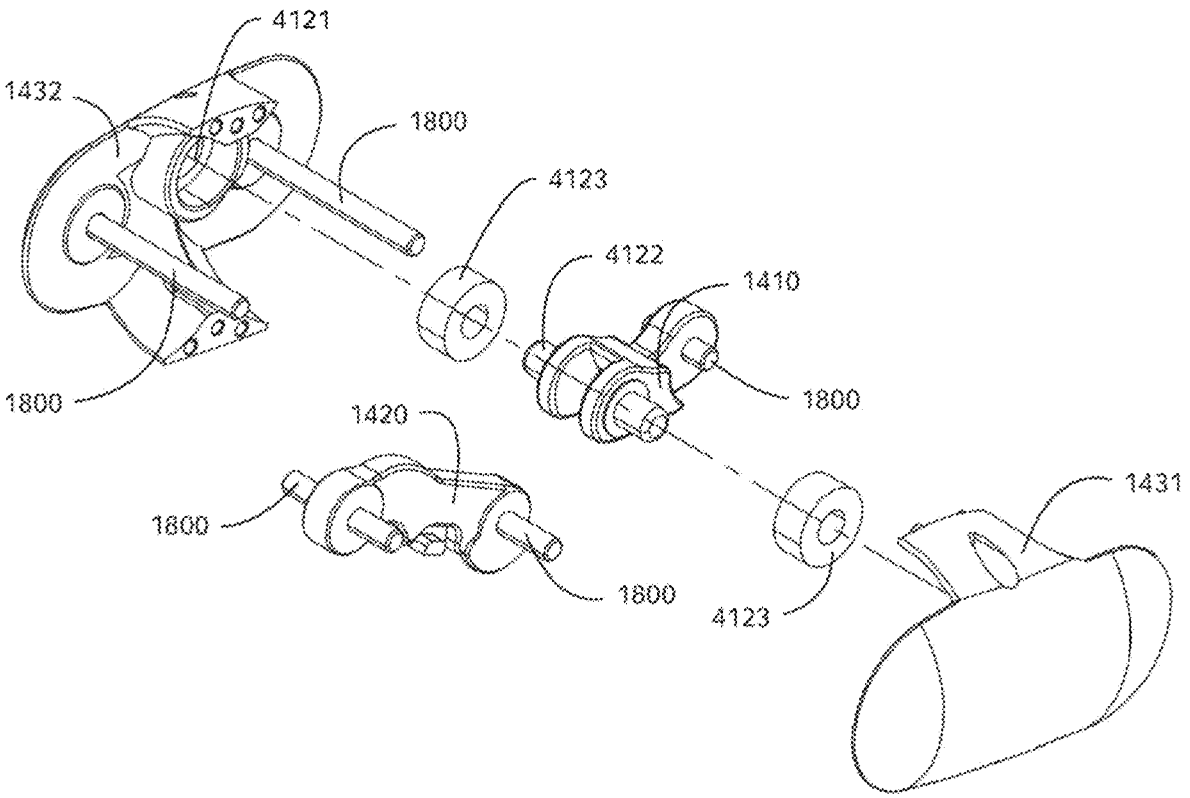

FIG. 22A and FIG. 22B illustrate the structure of one example of an intermediate component 1400. The intermediate component 1400 may include a third housing 1431 (also called a shell herein) and a corresponding fourth housing 1432 (also called a shell herein), which can fit together to form a housing of the intermediate component 1400 with a first cavity portion 1440 inside the intermediate component 1400. As shown in FIGS. 22A, 22B 24A-24D, and 25-27, the interior of the first cavity portion 1440 may have arranged therein a first linkage component 1410, a second linkage component 1420, a first hinge joint 1411, a second hinge joint 1412, a third hinge joint 1421, and a fourth hinge joint 1422. In addition, the first cavity portion 1440 may receive therein at least a portion of the distal component 1500 including the second proximal portion 1501, at least a portion of the proximal component 1300, and at least a portion of the power output end portion 1101.

Figure 23A:
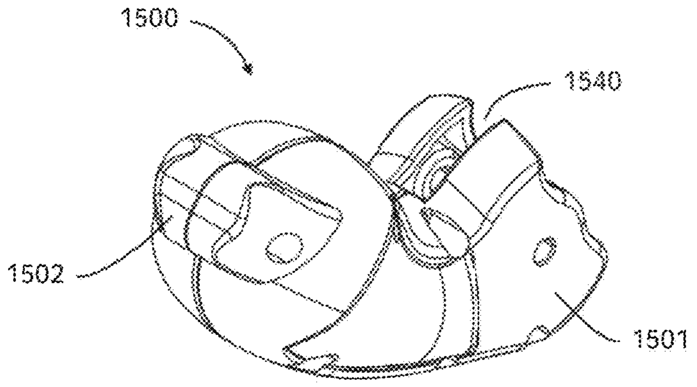
FIGS. 23A and 23B are perspective and exploded views, respectively, of a distal component of an exemplary stimulating device of the present disclosure.
Figure 23B:
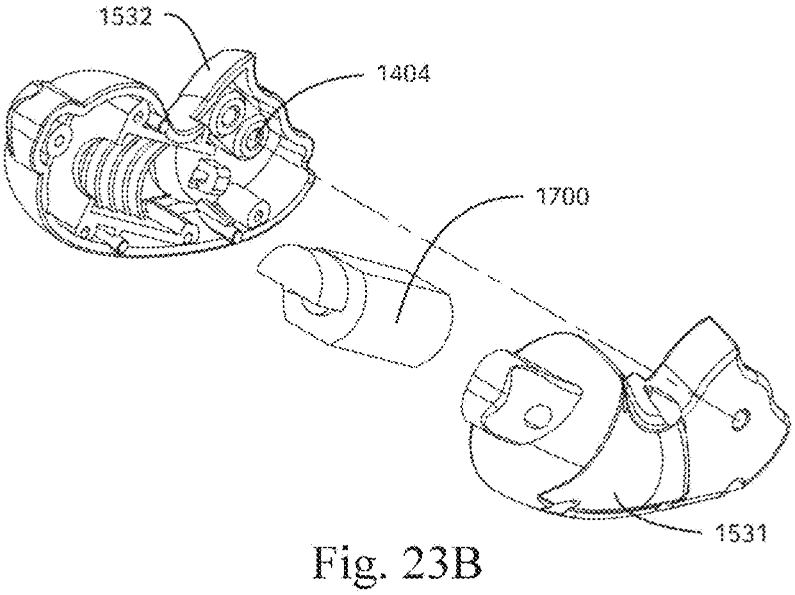

FIGS. 23A and 23B illustrate the structure of one example of a distal component 1500. The distal component 1500 may include a fifth housing 1531 (also called a shell herein) and a corresponding sixth housing 1532 (also called a shell herein), which can fit together to form a housing of the distal component 1500 with a second cavity portion 1540. The interior of the second cavity portion 1540 may have a vibration motor 1700 arranged therein. The vibration motor 1700 is disposed in a portion of the second cavity portion 1540 inside the second distal phalanx portion 1502, while another portion of the second cavity portion 1540 inside the second proximal phalanx portion 1501 may serve as a stowage cavity for receiving a wire for connecting the vibration motor 1700 to the control circuit 1109.

Referring to FIGS. 19-27, the first proximal portion 1401 of the intermediate component 1400 may be coupled to the power output end portion 1101 of the actuator 1100 via the first linkage component 1410. In one embodiment, one end of the first linkage component 1410 may be hinged at the first hinge joint 1411 with the power output power output end portion 1101, and the other end of the first linkage component 1410 may be hinged at the second hinge joint 1412 with the intermediate component 1400. In addition, one end of the second linkage component 1420 may be hinged at the proximal component 1300 at the third hinge joint 1421, and the other end of the second link component 1420 may be hinged at the fourth hinge joint 1422 with the second proximal portion 1501 of the distal component 500. In such a case, the intermediate component 1400 may itself act as a third link component, and the intermediate component 1400 forms a multilink mechanism by mating with the first link component 1410 and the second link component 1420 to form a multilink mechanism. With this structure, the power output end portion 1101 actuates the intermediate component 1400 such that the second distal portion 1502 of the distal component 1500 undergoes a rocking (swinging) motion with respect to the first proximal portion 1401 of the intermediate component 1400. The rocking motion enables the second distal portion 1502 of the distal component 1500 to be positioned s desired and to stroke and/or press the G-spot in the vagina or the prostate gland in the rectum, simulating a finger as shown in FIG. 18.

Figure 25:
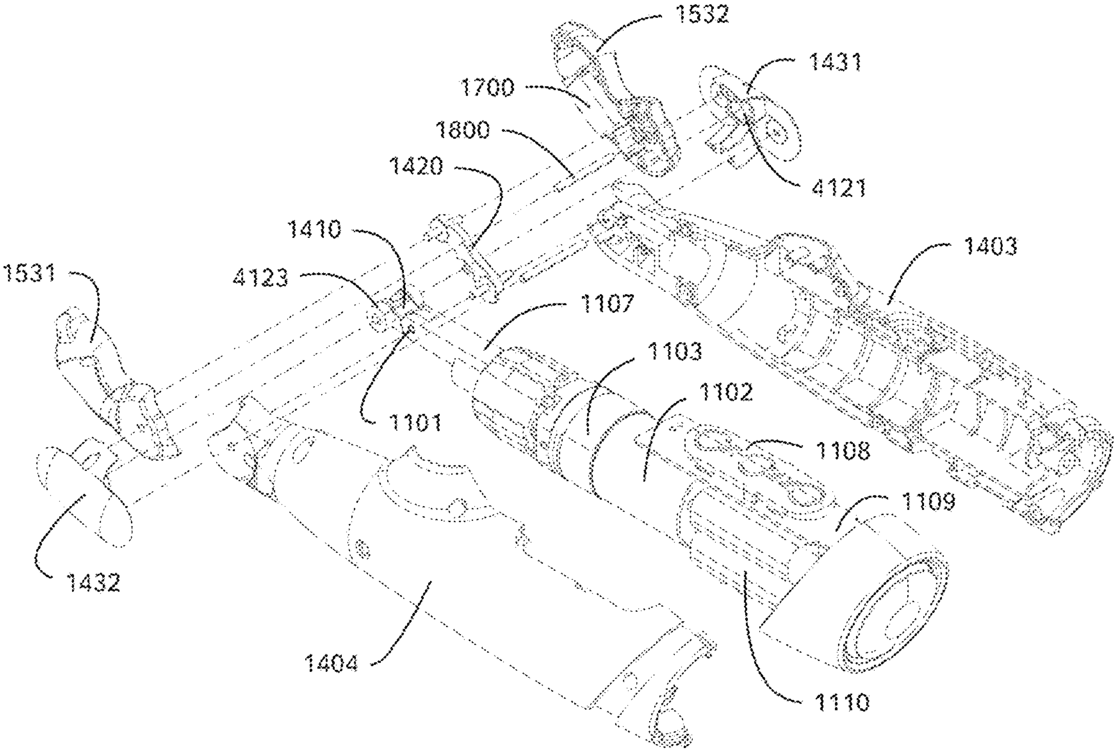
FIG. 25 shows an exploded view of an exemplary stimulating device of the present disclosure when it is not encased in a flexible covering.

In at least some exemplary embodiments, referring to FIGS. 22B and 25, the joints 1403, 1404, 1411, 1421, and 1422 (in other words, the joints of the intermediate component 1400 other than the second hinge joint 1412), can all be realized by five shaft rods 1800 connecting the proximal component 1300 and the intermediate component 1400 at the proximal interphalangeal joint 1403, connecting the intermediate component 1400 and the distal component 1500 at the distal interphalangeal joint 1404, connecting the first linkage component 1410 and the power output power output end portion 1101 at the first hinge joint 1411, connecting the second linkage component 1420 and the proximal component 1300 at the third hinge joint 1421, and connecting the second link component 1420 with the distal phalangeal joint 500 at the fourth hinge joint 1422.

Figure 26:
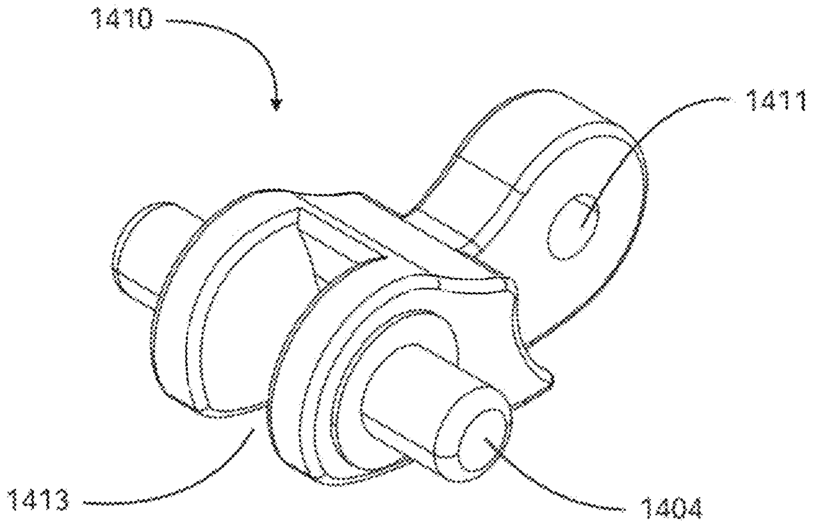
FIG. 26 shows a perspective view of a first linkage component of an exemplary stimulating device of the present disclosure.

In at least some exemplary embodiments, referring to FIGS. 22B and 26, the second hinge joint 1412 may be implemented by a pair of cylindrical projections 4122 and a pair of circular receiving slots 4121 mated thereto. The pair of cylindrical projections 4122 may be disposed on each side of the first linkage component 1410, and the circular receiving slots 4121 may be provided on the inner sides of the third housing 1431 and the corresponding fourth housing 1432. The circular receiving slots 4121 may be coupled with the cylindrical projections 4122 respectively by bushings 4123 so as to enable the first linkage component 410 to rotate relative to the intermediate component 1400.

Figure 27:
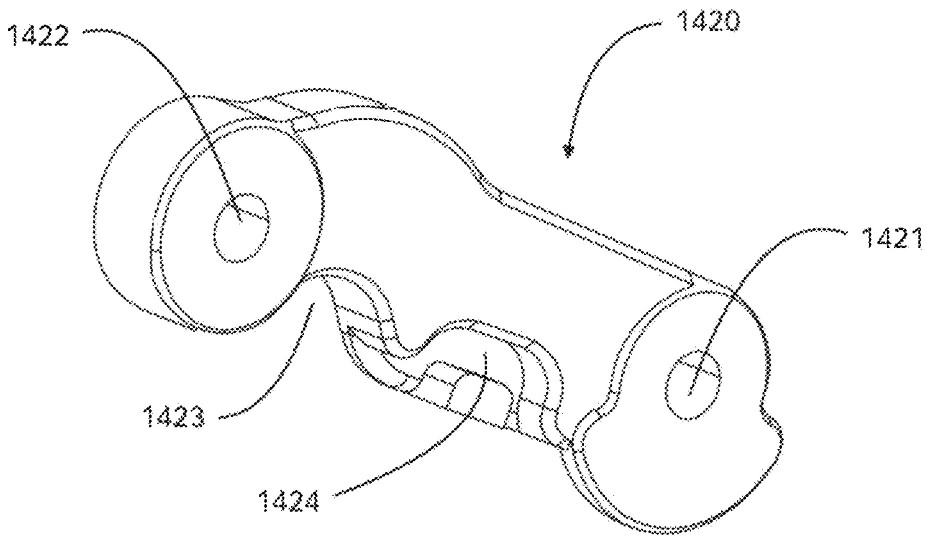
FIG. 27 is a perspective view of a second linkage component of an exemplary stimulating device of the present disclosure.

In at least some exemplary embodiments, referring to FIGS. 26 and 27, the first linkage component 1410 may have a receiving slot 1413 that may be used to receive a portion of the second linkage component 1420, thereby preventing the second linkage component 1420 from mechanically interfering with the first linkage component 1410 when active. In one embodiment, the second linkage component 1420 has an arcuate portion 1423 at the bottom of the second linkage component 1420, and the arcuate portion 1423 is configured to receive the distal interphalangeal joint 1404 so as to prevent the distal interphalangeal joint 1404 from mechanically interfering with the second linkage component 1420 when the distal component 1500 is undergoing the rocking (swinging) motion. In one embodiment, the bottom of the second linkage member 1420 may have a wire retention slot 1424.

In operation, the bionic finger assembly 1900 can be caused to make a hooking motion as a result of the connections and components described above, as to assume a static position or so as to execute an animated routine. For example, the actuator 1100, operating under control of the control circuit 1109, can extend and withdraw the power output end portion 1101. When the power output end portion 1101 is withdrawn, the first hinge joint 1411 at one end of the first linkage component 1410 is pulled proximally, thereby pulling the first linkage component 1410 to pull the second hinge joint 1412 connected to the second component at the other end of the first linkage component 1410. In accordance with these pulling movements, the intermediate component 1400 rotates upward about the proximal interphalangeal joint 1403, and the second linkage component 1420 rotates upward about the third hinge joint 1421. The movement of the second linkage component 1420 is transmitted to the distal component 1500 via the fourth hinge joint 1422, and the distal component 1500 rotates upward/inward about the distal interphalangeal joint 1404. See FIGS. 24A to 24C. Thus, as described above, the intermediate component 1400 forms a multilink mechanism by mating with the first link component 1410 and the second link component 1420 to form a multilink mechanism. With this structure, the power output end portion 1101 actuates the intermediate component 1400 such that the second distal portion 1502 of the distal component 1500 undergoes a rocking (swinging) motion with respect to the first proximal portion 1401 of the intermediate component 1400. The rocking motion enables the second distal portion 1502 of the distal component 1500 to be positioned as desired and to stroke and/or press the G-spot in the vagina or the prostate gland in the rectum, simulating a finger as shown in FIG. 18. On the other hand, when the power output end portion 1101, motion in the opposite direction occurs, and the bionic finger assembly 1900 is extended.

In other exemplary embodiments, as shown in FIGS. 24A-24C, when the bionic finger assembly 1900 is in the extended state, the proximal component 1300 may encircle the first linkage component 1410 and a majority of the second linkage component 1420, whereas when the bionic finger assembly 1900 is in the hooked up state, the proximal component 1300 may only encircle the first linkage component 1410 and a proximal part of second linkage component 1420. In an alternative embodiment, when the bionic finger assembly 1900 is in the hooked up state, the proximal component 1300 may encircle the first linkage component 1410 and a majority of the second linkage component 1420. In addition, in at least some embodiments, the middle component 1400 may enclose the first and second linkage components 1410 and 1420 when the bionic finger assembly 1900 is in the extended state. In the same or different embodiments, the middle component 1400 may enclose the first and second linkage components 1410 and 1420 when the bionic finger assembly 1900 is in the hooked-up state.

In at least some exemplary embodiments, referring to FIG. 19, FIGS. 24A-24D, and FIGS. 28A-28B, a portion of the flexible covering member 1600 located at the proximal and distal interphalangeal joints 1403 and 1404 may undergo a tensile strain when the bionic finger assembly 1900 is in the extended state and may undergo a stress (pressure) strain when the bionic finger assembly 1900 is in the hooked up state.

In at least some embodiments, the straight line distance L (FIG. 24D) between the proximal interphalangeal joint 1403 and the distal interphalangeal joint 1404 may be between 15 millimeters and 25 millimeters, so that the intermediate component 1400 is not too long and is not uncomfortable for the user during movement, and the second linkage component 1420 may have a length greater than the first linkage component 1410. In addition, in at least some exemplary embodiments, referring to FIGS. 24A-24C, the proximal interphalangeal joint 1403 may always be located between the first hinge joint 1411 and the third hinge joint 1421. In one embodiment, the distal interphalangeal joint 404 may be arranged in close proximity to the fourth hinge joint 1422, e.g., with a gap of no greater than 5 mm between the distal interphalangeal joint 1404 and the fourth hinge joint 1422. Moreover, the second hinge joint 1412 may be disposed at or near a midpoint between the proximal interphalangeal joint 403 and the distal interphalangeal joint 1404.

In one embodiment, in order to make the user less likely to feel discomfort when using the sexual stimulating device, when the bionic finger assembly 1900 is in the hooked up state, that is, when the second distal portion 1502 of the distal component 1500 is swinging to its highest point, the vertical distance H of the very end of the second distal portion 1502 with respect to the bottom of the proximal component 1300 may be in a range of from 30 millimeters to 70 millimeters, and when the vertical distance H is between 40 millimeters and 65 millimeters, the bionic finger assembly 1900 is most comfortable when within the body of the user.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A sexual stimulation device comprising:

an actuator having a power output end portion;

a main body, at least a portion of the main body forming a proximal component, wherein the power output end portion is disposed within the proximal component;

a middle component having a first proximal portion and a first distal portion, wherein the first proximal portion is hinged to the proximal component by an articulated connection; and a distal component, having a second proximal portion and a second distal portion, wherein the second proximal portion is hinged to the first distal portion of the middle component by an articulated connection, wherein the proximal component, the middle component, and the distal component together form a bionic finger assembly configured to be inserted into an orifice of a human body, wherein the middle component is coupled to the power output end portion and the distal component is coupled to the proximal component, wherein the second distal portion of the distal component is caused to execute a rocking motion with respect to the first proximal portion of the middle component as the power output end portion is actuated by the actuator, and wherein the rocking motion is adapted to cause the second distal portion of the distal component to achieve stimulation of an erogenous zone within the orifice of the human body.

2. The sexual stimulation device of claim 1, further comprising:

a first linkage component which is hinged to the power output end portion at a first hinge joint and hinged to the middle component at a second hinge joint; and a second linkage component which is hinged to the proximal component at a third hinge joint and hinged to the second proximal portion of the distal component at a fourth hinge joint.

3. The sexual stimulation device of claim 2, further comprising:

a proximal interphalangeal joint at the articulated connection of the first proximal portion of the middle component with the proximal component; and a distal interphalangeal joint at the articulated connection of the first distal portion of the middle component with the second proximal portion of the distal component.

4. The sexual stimulation device of claim 3, wherein the distal interphalangeal joint is arranged adjacent to the fourth hinge joint.

5. The sexual stimulation device of claim 3, wherein the second linkage component has an arcuate portion at a bottom thereof, and wherein the arcuate portion is configured to accommodate the distal interphalangeal joint.

6. The sexual stimulation device of claim 3, wherein the proximal interphalangeal joint remains substantially between the first hinge joint and the third hinge joint.

7. The sexual stimulation device of claim 3, wherein the middle component includes two shells which fit together to form a cavity portion, and wherein the cavity portion is configured to accommodate at least one of the following components or portions: the first and second linkage components, the first, second, third, and fourth hinge joints, at least part of the second proximal portion, and part a portion of the proximal component.

8. The sexual stimulation device of claim 7, wherein the second hinge joint comprises:

a pair of cylindrical projections, the cylindrical projections being provided on each side of the first linkage component; and a pair of circular receiving slots disposed in the two shells, respectively, wherein the cylindrical receiving slots are configured to accommodate the cylindrical projections.

9. The sexual stimulation device of claim 3, further comprising a flexible covering member configured to cover at least a portion of the main body.

10. The sexual stimulation device of claim 9, wherein the bionic finger assembly is covered by the flexible covering member, and wherein the flexible covering member is configured such that a portion of the flexible covering member disposed at the proximal and distal interphalangeal joints undergoes a tensile strain as the bionic finger assembly is in an extended state, and undergoes a pressure strain as the bionic finger assembly is in a hooked state.

11. The sexual stimulation device of claim 2, wherein the middle component is configured to enclose all hinge joints.

12. The sexual stimulation device of claim 2, wherein the first linkage component has a receiving slot configured to receive at least a portion of the second linkage component.

13. The sexual stimulation device of claim 2, wherein the second linkage component is longer than the first linkage component.

14. The sexual stimulation device of claim 2, wherein the middle component is configured to enclose the first and second linkage components when the bionic finger assembly is in an extended state.

15. The sexual stimulation device of claim 2, wherein the middle component is configured to enclose the first and second linkage components when the bionic finger assembly is in a hooked-up state.

16. The sexual stimulation device of claim 1, further comprising;

a proximal interphalangeal joint at the articulated connection of the first proximal portion of the middle component with the proximal component; and a distal interphalangeal joint at the articulated connection of the first distal portion of the middle component with the second proximal portion of the distal component, wherein a straight-line distance between the proximal interphalangeal joint and the distal interphalangeal joint is in the range of 15 millimeters to 25 millimeters.

17. The sexual stimulation device of claim 1, wherein when the second distal portion of the distal component is rocked to its highest point, there is a vertical distance in the range of 30 millimeters to 70 millimeters from a top end of the second distal portion to a bottom of the proximal component.

18. The sexual stimulation device of claim 1, wherein when the second distal portion of the distal component is rocked to its highest point, there is a vertical distance in the range of 40 millimeters to 65 millimeters from a top end of the second distal portion to a bottom of the proximal component.

19. The sexual stimulation device of claim 1, wherein the distal component includes a vibration motor within the second distal portion of the distal component.

20. The sexual stimulation device of claim 1, wherein the actuator comprises:

a rotary motor;

a reduction gearbox coupled to a rotation axis of the rotary motor, and a linear reciprocating mechanism coupled to an output shaft of the reduction gearbox, which is configured to drive the power output end portion to generate a reciprocating motion such that the second distal portion of the distal component reciprocates to rock, thereby generating a finger-hook-up stimulation that can act on the erogenous zone within the orifice of the human body.

* * * * *